US012400358B2

(12) United States Patent
Urtasun et al.

(10) Patent No.: US 12,400,358 B2
(45) Date of Patent: *Aug. 26, 2025

(54) IMAGE BASED LOCALIZATION SYSTEM

(71) Applicant: Aurora Operations, Inc., Pittsburgh, PA (US)

(72) Inventors: Raquel Urtasun, Toronto (CA); Julieta Martinez Covarrubias, Toronto (CA); Shenlong Wang, Toronto (CA); Hongbo Fan, Toronto (CA)

(73) Assignee: AURORA OPERATIONS, INC., Pittsburgh, PA (US)

( * ) Notice: Subject to any disclaimer, the term of this patent is extended or adjusted under 35 U.S.C. 154(b) by 321 days.

This patent is subject to a terminal disclaimer.

(21) Appl. No.: 17/833,414

(22) Filed: Jun. 6, 2022

(65) Prior Publication Data

US 2022/0319047 A1 Oct. 6, 2022

Related U.S. Application Data

(63) Continuation of application No. 16/573,592, filed on Sep. 17, 2019, now Pat. No. 11,354,820.

(Continued)

(51) Int. Cl.
*G06T 7/73* (2017.01)
*G06F 18/2135* (2023.01)
(Continued)

(52) U.S. Cl.
CPC .......... *G06T 7/73* (2017.01); *G06F 18/21355* (2023.01); *G06F 18/214* (2023.01);
(Continued)

(58) Field of Classification Search
CPC ... G06T 7/73; G06T 7/75; G06T 2207/20081; G06T 2207/30248; G06T 2207/20084;
(Continued)

(56) References Cited

U.S. PATENT DOCUMENTS 10,832,062 B1 11/2020 Evans et al.
10,997,746 B2 5/2021 He et al.
(Continued)

OTHER PUBLICATIONS

Arandjelovic et al., "CNN Architecture for Weakly Supervised Place Recognition", 2016 IEEE Conference on Computer Vision and Pattern Recognition, 2016, pp. 5297-5307.
(Continued)

*Primary Examiner* — Tom Y Lu
(74) *Attorney, Agent, or Firm* — Dority & Manning, P.A.

(57) ABSTRACT

Systems and methods for determining a location based on image data are provided. A method can include receiving, by a computing system, a query image depicting a surrounding environment of a vehicle. The query image can be input into a machine-learned image embedding model and a machine-learned feature extraction model to obtain a query embedding and a query feature representation, respectively. The method can include identifying a subset of candidate embeddings that have embeddings similar to the query embedding. The method can include obtaining a respective feature representation for each image associated with the subset of candidate embeddings. The method can include determining a set of relative displacements between each image associated with the subset of candidate embeddings and the query image and determining a localized state of a vehicle based at least in part on the set of relative displacements.

20 Claims, 9 Drawing Sheets

Related U.S. Application Data

(60) Provisional application No. 62/829,672, filed on Apr. 5, 2019, provisional application No. 62/768,898, filed on Nov. 17, 2018.

(51) Int. Cl.
| | |
|---|---|
| G06F 18/214 | (2023.01) |
| G06F 18/22 | (2023.01) |
| G06V 10/74 | (2022.01) |
| G06V 10/77 | (2022.01) |
| G06V 10/774 | (2022.01) |
| G06V 20/56 | (2022.01) |

(52) U.S. Cl.
CPC ............... *G06F 18/22* (2023.01); *G06T 7/75* (2017.01); *G06V 10/761* (2022.01); *G06V 10/7715* (2022.01); *G06V 10/774* (2022.01); *G06V 20/56* (2022.01); *G06T 2207/20081* (2013.01); *G06T 2207/30248* (2013.01)

(58) Field of Classification Search
CPC .. G06F 18/21355; G06F 18/214; G06F 18/22; G06V 10/761; G06V 10/7715; G06V 10/774; G06V 20/56
See application file for complete search history.

(56) References Cited

U.S. PATENT DOCUMENTS

| | | | | |
|---|---|---|---|---|
| 11,354,820 | B2* | 6/2022 | Urtasun | G06V 20/56 |
| 11,488,391 | B2* | 11/2022 | Kang | G06V 10/82 |
| 12,272,094 | B2* | 4/2025 | Türkoğlu | G06T 7/74 |
| 2007/0165910 | A1* | 7/2007 | Nagaoka | G06T 7/136 |
| | | | | 382/104 |
| 2016/0267326 | A1* | 9/2016 | Yagev | G06V 20/39 |
| 2019/0145784 | A1* | 5/2019 | Ma | G06F 16/29 |
| | | | | 701/448 |
| 2019/0303725 | A1* | 10/2019 | Gurvich | G06V 10/82 |
| 2020/0125899 | A1 | 4/2020 | Lee et al. | |
| 2020/0132473 | A1* | 4/2020 | Shipley | G01C 21/1652 |
| 2020/0160588 | A1 | 5/2020 | Muthler et al. | |
| 2020/0326707 | A1* | 10/2020 | Shashua | G05D 1/0088 |
| 2020/0401617 | A1* | 12/2020 | Spiegel | G06F 16/587 |
| 2021/0142078 | A1 | 5/2021 | Evans et al. | |
| 2021/0295174 | A1 | 9/2021 | Zhang et al. | |

OTHER PUBLICATIONS

Babenko et al., "The Inverted Multi-Index", Computer Vision and Pattern Recognition, 2012, pp. 3069-3076.
Barsan et al., "Learning to Localize Using a Lidar Intensity Map", Proceedings of the Second Conference on Robot Learning, vol. 87 of Proceedings of Machine Learning Research, Oct. 29-31, 2018, 13 pages.
Brachmann et al., "Learning Less is More-6D Camera Localization via 3D Surface Regression", in the Proceedings of the IEE Conference on Computer Vision and Pattern Recognition, vol. 8, 2018, 9 pages.
Brahmbatt et al., "Geometry-Aware Learning of Maps for Camera Localization", Proceedings of the IEEE Conference on Computer Vision and Pattern Recognition, pp. 2616-2625.
Brox et al., "Large Displacement Optical Flow", IEEE Conference on Computer Vision and Pattern Recognition, 2009, 8 pages.
Carlevaris-Bianco et al., "University of Michigan North Campus Long-Term Vision and Lidar Dataset", The International Journal of Robotics Research, 35(9), 2016, 19 pages.
Chen et al., "City-Scale Landmark Identification on Mobile Devices", Computer Vision and Pattern Recognition, 2011, 8 pages.
Filliat et al., "A Visual Bag of Words Method for Interactive Qualitative Localization and Mapping", IEEE International Conference on Robotics and Automation, 2007, 6 pages.
Geiger et al., "Are We Ready for Autonomous Driving? The Kitti Vision Benchmark Suite", IEEE Conference on Computer Vision and Pattern Recognition, 2012, 8 pages.
Gong et al., "A Procrustean Approach to Learning Binary Codes", Computer Vision and Pattern Recognition, pp. 817-824.
Gordo et al., "Learning Global Representations for Image Search", European Conference on Computer Vision, 2016, arxiv.org/1604.01325, Version 2, retrieved on Sep. 20, 2019, 21 pages.
Goyal et al., "Accurate, Large Minibatch SGD: Training Imagenet in 1 Hour", 2017, arxiv.org/1706,02677, retrieved on Sep. 20, 2019, 12 pages.
Gronat et al., "Learning and Calibrating Per-Location Classifiers for Visual Place Recognition", Proceedings of the IEEE Conference on Computer Vision and Pattern Recognition, 2013, pp. 907-914.
Havlena et al., "Vocmatch: Efficient Multiview Correspondence for Structure from Motion", European Conference on Computer Vision, 2014, 16 pages.
He et al., "Deep Residual Learning for Image Recognition", Proceedigns of the IEEE Conference on Computer Vision and Pattern Recognition, 2016, pp. 770-778.
Henriques et al., "An Allocentric Spatial Memory for Mapping Environments", Proceedings of the IEEE Conference on Computer Vision and Pattern Recognition, 2018, 9 pages.
Irschara et al., "From Structure-From-Motion Point Clouds to Fast Location Recognition", IEEE Conference on Computer Vision and Pattern Recognition, 2009, pp. 2599-2606.
Jain et al., "Learning a Complete Image Indexing Pipeline", 2017, arxiv.org/1712.04480, retrieved on Sep. 20, 2019, 10 pages.
Jégou et al., "Hamming Embedding and Weak Geometric Consistency for Large Scale Image Search", 2008, 15 pages.
Jégou et al., "Product Quantization for Nearest Neighbor Searhc", Transactions on Pattern Alaysis and Machine Intelligence, 33(1), 2011, 12 pages.
Jégou et al., "Aggregating Local Descriptors into a Compact Image Representation", IEEE Conference on Computer Vision and Pattern Recognition, 2010, 8 pages.
Kalantidis et al., "Cross-dimensional Weighting for Aggregated Deep Convolutional Features", European Conference on Computer Vision, Springer, 2016, www.arxiv.org/1512.04065v2, retrieved on Sep. 20, 2019, 16 pages.
Kendall et al., "Modelling Uncertainty in Deep Learning for Camera Relocalization", 2016 IEEE International Conference on Robotics and Automation, 2016, www.arxiv.org/1509.05909v2, retrieved on Sep. 20, 2019, 8 pages.
Kendall et al., "Posenet: A Convolutional Network for Real-Time 6-DOF Camera Relocalization" Proceedings of the IEEE International Conference on Computer Vision, 2015, pp. 2938-2946.
Kingma et al., "Adam: A Method for Stochastic Optimization", 2014, www.arxiv.org/1412.6980, retrieved on Sep. 20, 2019, 9 pages.
Martinez et al., "Revisiting Additive Quantization", European Conference on Computer Vision, 2016, 16 pages.
Matsui et al., "PQtable: Fast Exact Asymmetric Distance Neighbor Search for Product Quantization Using Hash Tables", International Conference on Computer Vision, 2015, pp. 1940-1948.
Norouzi et al., "Cartesian K-Means", Computer Vision and Pattern Recognition, 2013, pp. 3017-3024.
Norouzi et al., "Hamming Distance Metric Learning", Advances in Neural Information Processing Systems, 2012, 9 pages.
Radenović et al., "CNN Image Retrieval Learns from Bow: Unsupervised Fine-Tuning with Hard Examples", European Conference on Computer Vision, 2016, www.arxiv.org/1604.02426v3, retrieved on Sep. 20, 2019, 17 pages.
Radwan et al., "Deep Multitask Learning for Semantic Visual Localization and Odometry", 2018, www.arxiv.org/1804.08366, retrieved on Sep. 20, 2019, 8 pages.
Sattler et al., "Hyperpoints and Fine Vocabularies for Large-Scale Location Recognition", Proceedings of the IEEE International Conference on Computer Vision, 2015, pp. 2102-2110.
Sattler et al., "Benchmarking 6DOF Outdoor Visual Localization in Changing Conditions", Proceedings of the Conference on Computer Vision and Pattern Recognition, vol. 1, 2018, 10 pages.

(56) References Cited

OTHER PUBLICATIONS

Sattler et al., "Are Large-Scale 3D Models Really Necessary for Accurate Visual Localization?", Computer Vision and Pattern Recognition, 10 pages.

Schönberger et al., "Semantic Visual Localization", ISPRS Journal of Photogrammetry and Remote Sensing, 2018, 11 pages.

Sergeev et al., "Horovod: Fast and Easy Distributed Deep Learning in Tensorflow", ww.arxiv.org/1802.05799, retrieved on Sep. 20, 2019, 10 pages.

Shotton et al., "Scene Coordinate Regression Forests for Camera Relocalization in RGB-D Images", Proceedings of the IEEE Conference on Computer Vision and Pattern Recognition, 2013, pp. 2930-2937.

Tolias et al., "Particular Object Retrieval with Integral Max-Pooling of CNN Activations", International Conference on Learning Representations, 2016, www.arxiv.org/1511.05879v2, retrieved on Sep. 20, 2019, 12 pages.

Torii et al., "24/7 Place Recognition by View Synthesis", Proceedings of the IEEE Conference on Computer Vision and Pattern Recognition, 2015, 14 pages.

Torii et al., "Visual Place Recognition with Repetitive Structures", Proceedings of the IEEE Conference on Computer Vision and Pattern Recognition, 2013, pp. 883-890.

Valada et al., "Deep Auxiliary Learning for Visual Localization and Odometry", IEEE International Conference on Robotics and Automation, www.arxiv.org/1803.03642, 2018, 8 pages.

Walch et al., "Image-Based Localization Using LSTMS for Structured Feature Correlation", International Conference on Computer Vision, 2017, www.arxiv.org/1611.07890v4, retrieved on Sep. 20, 2019, 11 pages.

Wang et al., "DeLS-3D: Deep Localization and Segmentation with a 3D Semantic Map", Proceedings of the IEEE Conference on Computer Vision and Pattern Recognition, 2018, pp. 5860-5869.

Weyand et al., "Planet-Photo Geolocation with Convolutional Neural Networks", European Conference on Computer Vision, Springer, 2016, www.arxiv.org/1602.05314v1, retrieved on Sep. 20, 2019, 10 pages.

\* cited by examiner

IMAGE BASED LOCALIZATION SYSTEM

PRIORITY CLAIM

The present application is a continuation of and is based on and claims benefit of U.S. Non-Provisional Application Ser. No. 16/573,592 having a filing date of Sep. 17, 2019, which is based on and claims benefit of both of U.S. Provisional Application No. 62/829,672 having a filing date of Apr. 5, 2019, and U.S. Provisional Application No. 62/768,898 having a filing date of Nov. 17, 2018, which are both incorporated by reference herein in their entireties.

FIELD

The present disclosure relates generally to devices, systems, and methods for determining a location based on image data. More particularly, the present disclosure relates to systems and methods for updating a localized state of an autonomous vehicle based on image data.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for determining a current location of an autonomous vehicle. The method includes receiving, by a computing system comprising one or more computing devices, a query image. The query image is collected by the autonomous vehicle and depicts a surrounding environment of the autonomous vehicle. The method includes inputting, by the computing system, the query image into a machine-learned image embedding model to receive a query embedding as an output of the machine-learned image embedding model. The method includes accessing, by the computing system, a database of pre-computed image embeddings. The pre-computed image embeddings are previously computed for a plurality of images by the machine-learned image embedding model. The method includes obtaining, by the computing system, a plurality of candidate embeddings from the database of pre-computed image embeddings based at least in part on vehicle location data associated with the autonomous vehicle and image location data associated with each pre-computed image embedding in the database of pre-computed image embeddings. The method includes comparing, by the computing system, the query embedding to the plurality of candidate embeddings to identify a subset of candidate embeddings that have embeddings that satisfy a similarity threshold. The method includes determining, by the computing system, a current location of the autonomous vehicle based at least in part on the image location data associated with each pre-computed image embedding in the subset of candidate embeddings.

Another example aspect of the present disclosure is directed to a computing system including one or more processors and one or more tangible, non-transitory, computer readable media that collectively store instructions that when executed by the one or more processors cause the computing system to perform operations. The operations include receiving a query image. The query image is collected by an autonomous vehicle and depicts a surrounding environment of the autonomous vehicle. The operations include inputting the query image into a machine-learned image embedding model to receive a query embedding as an output of the machine-learned image embedding model. The operations include accessing a database of pre-computed image embeddings. The pre-computed image embeddings are previously computed for a plurality of images by the machine-learned image embedding model. The operations include obtaining a plurality of candidate embeddings from the database of pre-computed image embeddings based at least in part on vehicle location data associated with the autonomous vehicle and image location data associated with each pre-computed image embedding in the database of pre-computed image embeddings. The operations include comparing the query embedding to the plurality of candidate embeddings to identify a subset of candidate embeddings that satisfy a threshold. The operations include determining a current location of the autonomous vehicle based at least in part on the image location data associated with each pre-computed image embedding in the subset of candidate embeddings.

Yet another example aspect of the present disclosure is directed to an autonomous vehicle. The autonomous vehicle includes one or more vehicle sensors, one or more processors, a machine-learned feature extraction model, a machine-learned regression model, and one or more tangible, non-transitory, computer readable media that collectively store instructions that when executed by the one or more processors cause the one or more processors to perform operations. The operation include collecting, via the one or more vehicle sensors, a query image. The query image depicts a surrounding environment of the autonomous vehicle. The operations include obtaining, via the machine-learned feature extraction model, a query feature representation by inputting the query image into the machine-learned feature extraction model. The operations include obtaining a respective feature representation associated with the candidate image for each of a plurality of candidate images. The operations include obtaining, via the machine-learned regression model, a respective relative displacement for each of the plurality of candidate images by inputting the query feature representation and the respective feature representation into the machine-learned regression model. The operations include determining a current location of the autonomous vehicle based at least in part on the respective relative displacement obtained for each of the plurality of candidate images.

Other example aspects of the present disclosure are directed to systems, methods, vehicles, apparatuses, tangible, non-transitory computer-readable media, and memory devices for determining a location based on image data.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
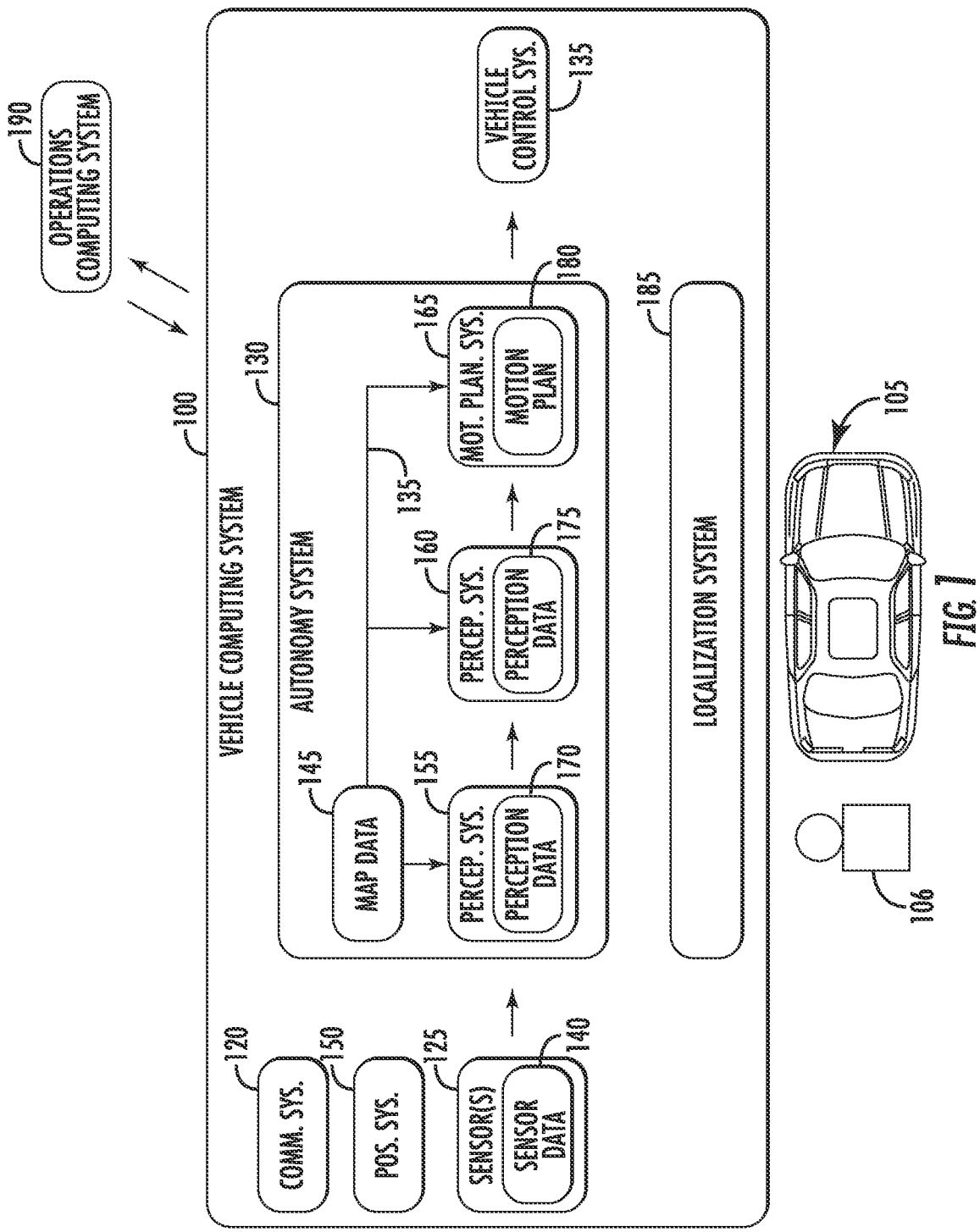
FIG. 1 depicts an example system overview according to example implementations of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Generally, the present disclosure is directed to improved systems and methods for updating a localized state of an autonomous vehicle based on image data. In example implementations, a computing system can receive a query image and location data (e.g., geolocation coordinates, a heading angle, etc.) associated with an autonomous vehicle. For example, the query image can be captured by a sensor (e.g., camera) of the autonomous vehicle and can depict a surrounding environment of the autonomous vehicle. The query image can be input into a machine-learned image embedding model and a machine-learned feature extraction model to receive a query embedding and a query feature representation, respectively. The computing system can retrieve a plurality of pre-computed image embeddings from a database of pre-computed image embeddings based on the location data associated with the autonomous vehicle. For example, the pre-computed image embeddings can be previously computed for a plurality of images by the machine-learned image embedding model. In one example, pre-computed image embeddings are obtained for any image which has a location that is within a certain distance from the location of the autonomous vehicle. The computing system can compare the query embedding with the plurality of pre-computed image embeddings to obtain a subset of image embeddings most similar to the query embedding. A respective feature representation can be obtained for each image embedding in the subset of image embeddings. For example, feature representations can be pre-computed for the plurality of images by a machine-learned feature extraction model. Thus, for each image, an embedding and/or a feature representation can be pre-computed and stored for later access by the computing system. The computing system can input the query feature representation and the respective feature representation for the respective image associated with each image embedding in the subset of image embeddings into a machine-learned regression model. The machine-learned regression model can output a set of relative displacements including a respective relative displacement between the query image and the image associated with each image embedding in the subset of image embeddings. The set of relative displacements can be aggregated to determine a single predicted location for the autonomous vehicle. For example, median values for various localization parameters (e.g., geolocation, heading, etc.) can be computed from the set of relative displacements. The computing system can update the localized state of the autonomous vehicle based at least in part on the predicted location. In this manner, the systems and methods of the present disclosure can leverage image data, location data, and machine learning techniques to efficiently and accurately determine an updated localized state for an autonomous vehicle.

In particular, aspects of the present disclosure leverage the ability of the image embeddings and/or the feature representations for the reference images to be pre-computed to greatly speed-up the localization process and enable the localization process to be performed, for example, on-board the autonomous vehicle. That is, in some implementations, rather than storing all of the reference images at the vehicle (which would be prohibitive to perform at a city-wide level due to memory space constraints), the localization system stores (or obtains from a server in real-time) only the pre-computed embeddings and/or pre-computed feature representations, which are much more memory-efficient and bandwidth-efficient than the images themselves. Furthermore, the embedding comparison process described above enables the selection of only a limited set of images for which the machine-learned regression model is used to compute a relative displacement. Thus, the number of times the regression model is run by the localization system can be significantly reduced by first performing the embedding-based search to identify only the subset of images that are most likely relevant to the localization process. In such fashion, the amount of computing resources (e.g., process usage, memory usage, etc.) can be significantly reduced, which enables the localization process to be performed in real-time and contribute to vehicle control operations.

More particularly, an autonomous vehicle (e.g., ground-based vehicle, aircraft, etc.) can include various systems and devices configured to control the operation of the vehicle. For example, an autonomous vehicle can include an onboard vehicle computing system (e.g., located on or within the autonomous vehicle) that is configured to operate the autonomous vehicle. The vehicle computing system can obtain sensor data from sensor(s) onboard the vehicle (e.g., cameras, LIDAR, RADAR, GPS, IMU etc.), track the vehicle's current location, generate an appropriate motion plan through the vehicle's surrounding environment based on the current location, etc. At times, the autonomous vehicle (or one or more systems onboard the autonomous system) can fail to precisely track the vehicle's location with respect to a particular environment, for example, due to sensor outages or imprecision, or algorithm failures. In such a case, the autonomous vehicle can include a localization system configured to accurately update a localized state of the autonomous vehicle with respect to its current environment. For example, the localization system can utilize sensor data in a processing pipeline that includes estimating the current geographical position of the vehicle based on image data. In this manner, the vehicle can recover its position within its current environment, for instance, in the case that the vehicle fails to track its pose due to sensor outages, algorithm failures, etc.

The localization system can obtain sensor data to update the localized state of the autonomous vehicle. In some implementations, the vehicle computing system can collect image data associated with the surrounding environment of the autonomous vehicle. For instance, the vehicle computing system can collect one or more query images depicting a surrounding environment of the autonomous vehicle via one or more cameras onboard the autonomous vehicle. The localization system can receive (e.g., from the vehicle computing system, one or more cameras, etc.) one or more of the query images depicting the surrounding environment of the autonomous vehicle. Additionally, in some embodiments, the localization system can obtain location data associated with the autonomous vehicle. For example, the location data can include a geolocation and/or a heading angle. In some embodiments, the location data can include Global Positioning System coordinates (e.g., GPS coordinates). For instance, the localization system can obtain a coarse GPS estimate (e.g., from the vehicle computing system, one or more sensors onboard the autonomous vehicle, etc.) including geolocation coordinates and/or a heading angle associated with the autonomous vehicle.

The localization system can input at least one query image of the one or more query images into a machine-learned image embedding model to receive a query embedding as an output of the machine-learned image embedding model. The query embedding can include one or more latent image descriptors associated with the query image. By way of example, in some implementations, the machine-learned image embedding model can be configured to generate a query embedding including one or more vectors of latent image descriptors corresponding to the query image. The machine-learned image embedding model can include one or more machine-learned models (e.g., neural network, convolutional neural network, etc.) stored in memory onboard the autonomous vehicle, in one or more remote servers (e.g., an operational computing system), or distributed on both the autonomous vehicle and one or more remote servers (e.g., an operational computing system). In such an implementation, the machine-learned image embedding model can be utilized by the autonomous vehicle (e.g., the onboard vehicle computing system, the localization system, etc.) and/or a remote server (e.g., an operational computing system), respectively, to generate image embeddings from one or more images. For instance, both the autonomous vehicle (e.g., the vehicle computing system, the localization system, etc.) and the remote server (e.g., an operational computing system) can input one or more images into the machine-learned image embedding model to receive one or more image embeddings, such as, for example, the query embedding.

The machine-learned image embedding model can be previously trained via one or more machine learning techniques using one or more images as constraints. For example, in some implementations, the machine-learned image embedding model can be previously trained by minimizing a loss over a triplet training scheme via backpropagation. By way of example, the triplet training scheme can utilize a plurality of image triplets. For example, the plurality of image triplets can be collected from a global image database including a plurality of images. The global image database can be stored onboard the autonomous vehicle, remote from the autonomous vehicle (e.g., in one or more remote servers, an operational computing system, etc.), or distributed on both the autonomous vehicle and one or more remote servers (e.g., an operational computing system). For example, in some implementations, the machine-learned image embedding model can be trained on one or more remote servers (e.g., an operational computing system) using images from a global image database stored on the one or more remote servers (e.g., operational computing system).

Each image triplet in the plurality of image triplets can include three images from the global image database, such as, for example, an anchor image, a positive image, and a negative image. Each image in the global image database can be associated with respective location data, such as, for example, a respective geolocation and a respective heading angle. In some implementations, each image triplet in the plurality of image triplets can include an anchor image associated with a respective geolocation that is closer to a respective geolocation associated with a positive image than a respective geolocation associated with a negative image. For example, in some implementations, the respective geolocation associated with the anchor image can be closer to the respective geolocation associated with the positive image than the respective geolocation associated with the negative image by a dynamically determined or predetermined threshold distance. In addition, or alternatively, each image triplet in the plurality of image triplets can include a positive image associated with a respective heading angle within the respective heading angle of the anchor image by a heading threshold. For example, the heading threshold can be a dynamically or predetermined angle to ensure that each image triplet in the plurality of image triplets includes a positive image and an anchor image with overlapping fields of view.

The localization system can access an image embedding database to obtain one or more pre-computed image embeddings. For example, the image embedding database can include one or more databases of pre-computed image embeddings each including a plurality of pre-computed image embeddings (e.g., a separate database can be maintained for each city, zip code, etc.). The image embedding database can be stored onboard the autonomous vehicle, remotely from the autonomous vehicle (e.g., in one or more remote servers, in an operational computing system, etc.), or distributed on both the autonomous vehicle and one or more remote servers (e.g., operational computing system). For example, in some implementations, the image embedding database is stored remote from the autonomous vehicle in one or more remote servers and/or in an operational computing system. In such an implementation, the localization system can communicate, via one or more communication interfaces on board the autonomous vehicle, with the one or more remote servers and/or the operational computing system to access the image embedding database.

The image embedding database can include a plurality of pre-computed image embeddings. The plurality of pre-computed image embeddings can be previously computed for the plurality of images in the global image database by the machine-learned image embedding model. For example, each of the plurality of images in the global image database can be input into the image embedding model to obtain a respective pre-computed image embedding for each of the plurality of images in the global image database. In some implementations, each of the pre-computed image embeddings can be associated with location data. For example, each of the pre-computed image embeddings can be associated with the location data associated with a respective image in the global image database.

The localization system can obtain a plurality of candidate embeddings from the pre-computed image embeddings in the image embedding database (e.g., the database of pre-computed image embeddings). The plurality of candidate embeddings can be stored in memory on board the autonomous vehicle (e.g., in an onboard embedding database), remote from the vehicle (e.g., in the one or more remote servers, an operational computing system, etc.), or both. For example, in some implementations, the plurality of candidate embeddings can be obtained from the image embedding database and stored in an onboard embedding database in memory onboard the autonomous vehicle. In addition, or alternatively, the plurality of candidate embeddings can remain in the image embedding database.

The localization system can obtain the plurality of candidate embeddings based at least in part on location data associated with the autonomous vehicle and the location data associated with each of the pre-computed image embeddings in the image embedding database. For example, the localization system can obtain location data (e.g., geolocation coordinates, heading angle, etc.) associated with the autonomous vehicle (e.g., from the vehicle computing system, one or more sensors onboard the autonomous vehicle such as GPS, etc.). In some implementations, the localization system can compare the location data associated with the autonomous vehicle with the location data associated with each of the pre-computed image embeddings in the image embedding database. For example, the localization system can obtain the plurality of candidate embeddings based on a distance between the geolocation coordinates associated with the autonomous vehicle and the geolocation coordinates associated with each of the pre-computed image embeddings in the image embedding database. By way of example, the localization system can determine a Euclidean distance between the geolocation coordinates associated with the autonomous vehicle and the geolocation coordinates associated with each pre-computed image embedding in the image embedding database.

In one example, the localization system can obtain the plurality of candidate embeddings from the pre-computed image embeddings associated with a respective distance below a threshold distance. The threshold distance can be any distance from the geolocation coordinates associated with the autonomous vehicle. For example, the threshold distance can include a ten-meter radius around the geolocation coordinates associated with the autonomous vehicle. In this manner, the plurality of candidate embeddings can include one or more pre-computed image embeddings from the image embedding database associated with geolocation coordinates within ten-meters of the geolocation coordinates associated with the autonomous vehicle. In another example, a certain number (e.g., 500) of the closest images can be obtained, rather than using a fixed threshold.

In some implementations, the localization system can downsample the plurality of candidate embeddings. For example, the localization system can uniformly downsample the plurality of candidate embeddings at random to obtain a fixed number of candidate embeddings. By way of example, the localization system can remove a random candidate embedding from the plurality of candidate embeddings to obtain a fixed number of candidate embeddings. The fixed number of candidate embeddings can be any number of candidate embeddings. For example, the fixed number of candidate embeddings can be determined to increase the processing speed (and/or efficiency) of the localization system. By way of example, in some implementations, the plurality of candidate embeddings can be downsampled at random to obtain two hundred and fifty candidate embeddings.

The localization system can compare the query embedding to the plurality of candidate embeddings to identify a subset of candidate embeddings that have embeddings that are closest to the query embedding. For example, comparing the query embedding to the plurality of candidate embeddings can include performing a k nearest neighbor search over the plurality of candidate embeddings. By way of example, the localization system can perform a k-nearest neighbor retrieval over the plurality of candidate embeddings based on the query embedding. For example, each candidate embedding in the plurality of candidate embeddings can be scored based on a respective similarity between the respective candidate embedding and the query embedding. The localization system can obtain the top scoring candidate embeddings in the plurality of candidate embeddings. In this manner, the k nearest neighbor search can identify a subset of candidate embeddings most similar to the query embedding. Other search/comparison techniques can be performed as well, including, for example, identifying a subset of candidate embeddings with the smallest L2 norm relative to the query embedding.

The subset of candidate embeddings can include any number of the plurality of candidate embeddings. In some implementations, the number of candidate embeddings included in the subset can be predetermined to increase the speed and efficiency of localization system. For example, in some implementations, the subset of candidate embeddings can include five candidate embeddings that are most similar to the query embedding.

The localization system can determine a predicted location of the autonomous vehicle based on the location data associated with each candidate embedding in the subset of candidate embeddings. For example, in some implementations, the localization system can determine the location of the autonomous vehicle based on a set relative displacements associated with the subset of candidate embeddings.

To do so, the localization system can obtain a respective feature representation associated with the query image and the respective image associated with each of the candidate embeddings in the subset of the candidate embeddings. The respective feature representations can include one or more global image descriptors associated with a respective image. For example, the localization system can obtain a query feature representation that includes one or more global image descriptors associated with the query image. By way of example, the localization system can input the query image into a machine-learned feature extraction model to obtain a query feature representation. The query feature representation can include one or more feature vectors associated with the query image. The feature vectors can include one or more visual descriptors. In this manner, the machine-learned feature extraction model can output one or more global image descriptors associated with the input image.

The machine-learned feature extraction model can include one or more machine-learned models. By way of example, the machine-learned feature extraction model can include a neural network architecture with one or more subnetworks. In some implementations, the subnetworks can include similar parameters and weights. The machine-learned feature extraction model (or e.g., a subnetwork of the feature extraction model) can be stored in memory onboard the autonomous vehicle, remote from the autonomous vehicle (e.g., on one or more remote servers, an operational computing system, etc.), or distributed on both the autonomous vehicle and one or more remote servers (e.g., an operational computing system). For example, in some implementations, the machine-learned feature extraction model (or e.g., a subnetwork of the feature extraction model) can be stored on a remote server (e.g., an operational computing system) and/or in memory onboard the autonomous vehicle. In such an implementation, the machine-learned feature extraction model can be utilized by the autonomous vehicle and the remote server (e.g., an operational computing system) to output feature representations for one or more input images. For instance, in some implementations, both the autonomous vehicle and one or more remote servers (e.g., an operational computing system) can input one or more images into the machine-learned feature extraction model to receive one or more feature representations corresponding to the one or more images.

The localization system can obtain a respective feature representation for a plurality of candidate images. For example, the localization system can obtain a respective feature representation for a respective image associated with each candidate embedding in the subset of candidate embeddings. The respective feature representation for the respective image can include one or more global image descriptors. In some implementations, the localization system can obtain the respective feature representations from a feature embedding database. The feature embedding database can include a plurality of feature embeddings. For example, the plurality of feature embeddings can be previously computed for each of the plurality of images in the global image database. By way of example, the plurality of images can be input into the machine-learned feature extraction model (e.g., or a subnetwork of the feature model) to obtain a respective feature representation for each of the plurality of images in the global image database. In this manner, each of the respective feature representations in the feature embedding database can be associated with a respective image embedding associated with each image in the global image database.

The feature embedding database can be stored in memory on board the autonomous vehicle, remote from the autonomous vehicle (e.g., in one or more remote servers, an operational computing system, etc.), or both. For example, in some implementations, the feature embedding database can be stored in one or more servers remote from the autonomous vehicle (e.g., in an operational computing system). In such a case, the localization system can communicate, via one or more communication interfaces onboard the autonomous vehicle, with the one or more remote servers (e.g., the operational computing system) to obtain one or more feature representations from the feature embedding database. For example, the localization system can access, via one or more communication interfaces onboard the autonomous vehicle, the feature representation database to obtain a respective feature representation for a respective image associated with each candidate embedding in the subset of candidate embeddings.

In some implementations, the localization system can determine a set of relative displacements associated with the subset of the candidate embeddings. The set of relative displacements can include a respective relative displacement between the query image and the respective image associated with each candidate embedding in the subset of candidate embeddings. The localization system can regress the set of relative displacements based on the query feature representation and the respective feature representation for each of a plurality of candidate images. For example, the localization system can regress the set of relative displacements based on the query feature representation and the respective feature representation for the image associated with each candidate embedding in the subset of candidate embeddings. By way of example, the localization system can input the query feature representation and a respective feature representation for the image associated with a respective candidate embedding in the subset of candidate embeddings into a machine-learned regression model to obtain a respective relative displacement between the query image and the image associated with the respective candidate embedding.

The machine-learned regression model can be configured to determine a respective relative displacement between the query image and the image associated with a candidate embedding based, at least in part, on the query feature representation and the respective feature representation. The localization system can obtain a relative displacement for each candidate embedding in the subset of candidate embeddings by inputting the query feature representation and a respective feature representation for the image associated with the respective candidate embedding into the machine-learned regression model. In this manner, the localization system can obtain a set of relative displacements including the respective relative displacement between the query image and the image associated with each of the candidate embeddings in the subset of candidate embeddings.

The machine-learned regression model can include one or more machine-learned models (e.g., neural network such as convolutional neural network, regression model, etc.). The machine-learned regression model can be stored in memory onboard the autonomous vehicle, remote from the autonomous vehicle (e.g., in one or more remote servers, operational computing system, etc.), or distributed on the autonomous vehicle and one or more remote servers (e.g., an operational computing system). In some implementations, the machine-learned regression model and the feature extraction model can be trained jointly and end-to-end via backpropagation. For example, the models can be trained jointly end-to-end on a set of training data. The set of training data can include a plurality of image tuples, each image tuple including a pair images from the plurality of images in the global image database. Each pair of training images can have a known ground truth displacement between the pair of training images. For example, the pair of images can include a first image from the global image database associated with a geolocation that is close to a geolocation associated with a second image from the global image database. By way of example, the image tuples can include two images associated with similar location data, such as, for example, similar geolocation coordinates (e.g., with some minor displacement).

The localization system can determine the predicted location of the autonomous vehicle based at least in part on the set of relative displacements. For example, the localization system can determine the predicted location of the autonomous vehicle by aggregating the set of relative displacements to obtain a single predicted location. By way of example, each of the respective relative displacements in the set of relative displacements can include location data. The location data, for example, can include one or more geolocation coordinates (e.g., a lateral coordinate and/or a longitudinal coordinate) and a heading angle. The localization system can aggregate the set of relative displacements by determining one or more median location coordinates and a median heading angle associated with the set of relative displacements.

The localization system can update the localized state of the autonomous vehicle based on the predicted location. By way of example, the localization system can communicate, via one or more onboard communication interfaces, with the vehicle computing system to provide data indicative of the predicted location to the vehicle computing system. The vehicle computing system can utilize the predicted location to update a localized state associated with the autonomous vehicle within the environment of the autonomous vehicle (e.g., by synthesizing the predicted location from the localization system with other signals indicative of vehicle location such as GPS, IMU, or other sensor measurements). Based on the localized state of the autonomous vehicle, the vehicle computing system can continue to accurately track the vehicle's current location, generate an appropriate motion plan through the vehicle's surrounding environment based on the current location, etc. For example, the localization system and/or the vehicle computing system can control the motion of the autonomous vehicle based at least in part on the localized state of the autonomous vehicle.

The systems and methods described herein provide a number of technical effects and benefits, particularly in the areas of computing technology, vehicles, and the integration of the computing technology in vehicles, such as in autonomous vehicles. In particular, example implementations of the disclosed technology provide improved techniques for updating a localized state of an autonomous vehicle based on image data. For example, utilizing the implementations of the disclosed technology, a computing system can avoid computational cost impediments inherent in accurately updating the localized state of an autonomous vehicle within large-scale outdoor environments. To do so, implementations of the disclosed technology employ a retrieve-regression-refine approach. For instance, implementations of the disclosed technology reduce the computational cost of determining a localized state of an autonomous vehicle by selectively retrieving candidate images from a global image database based on geolocation coordinates associated with the autonomous vehicle.

Moreover, the implementations of the disclosed technology can efficiently identify a subset of candidate images geographically close to the autonomous vehicle based on global identifiers rather than more robust image data. For example, implementations of the disclosed technology utilize pre-computed image embeddings including one or more image descriptors associated with each image in a global image database. For instance, the systems and methods of the disclosed technology can determine a query embedding including image descriptors associated with a query image depicting the surrounding environment of the autonomous vehicle. The systems and methods of the disclosed technology can then identify a subset of highly relevant candidate images by comparing the query embedding to the one or more pre-computed image embeddings in the global image database. By relying on global identifiers rather than more robust image data, the systems and methods of the disclosed technology can reduce the computational cost of determining the localized state of an autonomous vehicle; thereby, increasing the scalability and accuracy of localization systems in autonomous vehicles. In this manner, the systems and methods of the disclosed technology provide a technical solution to the "kidnapped robot" problem prevalent in the autonomous robotics systems in general.

Example aspects of the present disclosure can provide a number of improvements to vehicle computing technology, such as autonomous vehicle computing technology. For instance, the systems and methods of the present disclosure provide an improved approach for updating a localized state of an autonomous vehicle based on image data. For example, a computing system can receive a query image depicting a surrounding environment of an autonomous vehicle. The computing system can input the query image into a machine-learned image embedding model to receive a query embedding. The computing system can access a database of pre-computed image embeddings to obtain a plurality of candidate embedding previously computed from a plurality of images by the machine-learned image embedding model. The computing system can compare the query embedding to the plurality of candidate embeddings to identify a subset of candidate embeddings that have embeddings that are closest to the query embedding and then determine a predicted location based on the location data associated with the subset of candidate embeddings. In this manner, the computing system employs a new kind of localization system that increases the efficiency, scalability, and accuracy of previous localization techniques. For example, the localization system can save storage by strategically retrieving only similar candidate image embeddings from a database of pre-computed image embeddings. Moreover, by utilizing pre-computed image embeddings rather than more robust images, the localization system can efficiently compare the query image against a robust dataset without sacrificing accuracy. In this manner, the localization system can accumulate and utilize newly available information such as, for example, the pre-computed image embeddings to provide a practical improvement to autonomous vehicle technology; thereby, improving the functioning of autonomy systems in general by preventing "kidnapped robot" issues unique to autonomy computing systems.

Furthermore, although aspects of the present disclosure focus on application of the localization techniques described herein to autonomous vehicles, the systems and methods of the present disclosure can be used to localize any object based on a query image that depicts a surrounding environment of the object. Thus, for example, the systems and methods of the present disclosure can be used to localize a smartphone or other portable computing device by analyzing a query image captured by the device relative to a database of reference images (e.g., through the techniques described herein for embedding comparison and/or displacement regression based on feature representations).

With reference now to the FIGS., example aspects of the present disclosure will be discussed in further detail. FIG. 1 illustrates an example vehicle computing system 100 according to example embodiments of the present disclosure. The vehicle computing system 100 can be associated with a vehicle 105. The vehicle computing system 100 can be located onboard (e.g., included on and/or within) the vehicle 105.

The vehicle 105 incorporating the vehicle computing system 100 can be various types of vehicles. The vehicle 105 can be an autonomous vehicle. For instance, the vehicle 105 can be a ground-based autonomous vehicle such as an autonomous car, autonomous truck, autonomous bus, autonomous bicycle, autonomous scooter, etc. The vehicle 105 can be an air-based autonomous vehicle (e.g., airplane, helicopter, or other aircraft) or other types of vehicles (e.g., watercraft, etc.). The vehicle 105 can drive, navigate, operate, etc. with minimal and/or no interaction from a human operator 106 (e.g., driver). An operator 106 can be included in the vehicle 105 and/or remote from the vehicle 105. In some implementations, the vehicle 105 can be a non-autonomous vehicle.

In some implementations, the vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a vehicle operator present in the vehicle 105 and/or remote from the vehicle 105). The vehicle 105 can operate in a semi-autonomous operating mode in which the vehicle 105 can operate with some input from a vehicle operator present in the vehicle 105 (and/or a human operator that is remote from the vehicle 105). The vehicle 105 can enter into a manual operating mode in which the vehicle 105 is fully controllable by a vehicle operator (e.g., human driver, pilot, etc.) and can be prohibited and/or disabled (e.g., temporary, permanently, etc.) from performing autonomous navigation (e.g., autonomous driving). In some implementations, the vehicle 105 can implement vehicle operating assistance technology (e.g., collision mitigation system, power assist steering, etc.) while in the manual operating mode to help assist the vehicle operator of the vehicle 105.

The operating modes of the vehicle 105 can be stored in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 100 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. For example, in some implementations, the remote computing system can be an operations computing system 190, as disclosed herein. By way of example, such data communicated to a vehicle 105 by the operations computing system 190 can instruct the vehicle 105 to enter into the fully autonomous operating mode. In some implementations, the operating mode of the vehicle 105 can be set onboard and/or near the vehicle 105. For example, the vehicle computing system 100 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The operations computing system 190 can be any remote device capable of communicating with the vehicle 105. For example, the operations computing system 190 can transmit signals to the vehicle 105 to control the vehicle 105. By way of example, a vehicle operator 106 can remotely operate the vehicle 105 via the operations computing system 190. In addition, or alternatively, the operations computing system 190 can transmit data to vehicle computing system 100. For example, operations computing system 190 can store at least one of a global image database, an image embedding database, and/or a feature embedding database. The operations computing system 190 can transmit one or more images from the global image database to vehicle computing system 100, one or more image embeddings from the image embedding database, and/or one or more feature representations from the feature embedding database to vehicle computing system 100.

The vehicle computing system 100 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for determining a location based on image data.

The vehicle 105 can include a communications system 120 configured to allow the vehicle computing system 100 (and its computing device(s)) to communicate with other computing devices. The vehicle computing system 100 can use the communications system 120 to communicate with one or more computing device(s) that are remote from the vehicle 105 over one or more networks (e.g., via one or more wireless signal connections). In some implementations, the communications system 120 can allow communication among one or more of the system(s) on-board the vehicle 105. The communications system 120 can include any suitable components for interfacing with one or more network(s), including, for example, transmitters, receivers, ports, controllers, antennas, and/or other suitable components that can help facilitate communication.

As shown in FIG. 1, the vehicle 105 can include one or more vehicle sensors 125, an autonomy computing system 130, one or more vehicle control systems 135, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 125 can be configured to acquire sensor data 140. This can include sensor data associated with the surrounding environment of the vehicle 105. For instance, the vehicle sensor(s) 125 can acquire images and/or other data within a field of view of one or more of the vehicle sensor(s) 125. The vehicle sensor(s) 125 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 140 can include image data, RADAR data, LIDAR data, and/or other data acquired by the vehicle sensor(s) 125. The vehicle 105 can also include other sensors configured to acquire data such as vehicle location data associated with the vehicle 105. For example, the vehicle 105 can include Global Positioning Sensors, inertial measurement unit(s), wheel odometry devices, and/or other sensors.

As discussed in further detail with reference to FIG. 2, in some implementations, the sensor data 140 can include image data associated with the surrounding environment of vehicle 105. Image data, for example, can include RADAR data, LIDAR, etc. For instance, the sensor data 140 can include one or more query images depicting a surrounding environment of vehicle 105. In addition, the sensor data 140 can include vehicle location data associated with vehicle 105. For example, the vehicle location data can include a geolocation and/or a heading angle. In some implementations, the vehicle location data can include Global Positioning System coordinates (e.g., GPS coordinates). For instance, the vehicle location data can include a coarse GPS estimate including geolocation coordinates and/or a heading angle associated with vehicle 105. In addition, or alternatively, location data can include data obtained from one or more other vehicles. For example, the location data can be obtained via communication system 120. By way of example, the vehicle 105 can communicate with one or more vehicles and/or operations computing system 190 to obtain location data. The vehicle sensor(s) 125 can provide the sensor data 140 to the autonomy computing system 130, localization system 185, etc.

In addition to the sensor data 140, the autonomy computing system 130 can retrieve or otherwise obtain map data 145. The map data 145 can provide information about the surrounding environment of the vehicle 105. In some implementations, a vehicle 105 can obtain detailed map data that provides information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the vehicle 105 in comprehending and perceiving its surrounding environment and its relationship thereto. In some implementations, the vehicle computing system 100 can determine a vehicle route for the vehicle 105 based at least in part on the map data 145 and current location data (e.g., a localized state).

The vehicle 105 can include a positioning system 150. The positioning system 150 can determine a current position of the vehicle 105. The positioning system 150 can be any device or circuitry for analyzing the position of the vehicle 105. For example, the positioning system 150 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 100 and/or provided to a remote computing system such as operations computing system 190. For example, the map data 145 can provide the vehicle 105 relative positions of the elements of a surrounding environment of the vehicle 105. The vehicle 105 can identify its position within the surrounding environment (e.g., across six axes, etc.) based at least in part on the map data 145. For example, the vehicle computing system 100 can process the sensor data 140 (e.g., LIDAR data, camera data, etc.) to match it to a map of the surrounding environment to get an understanding of the vehicle's position within that environment.

At times, the positioning system 150 can fail to precisely track the vehicle's location with respect to a particular environment, for example, due to sensor outages or imprecision, or algorithm failures. To increase localization accuracy the vehicle 105 can include a localization system 185 configured to accurately predict current location data (e.g., a localized state) associated with vehicle 105 with respect to its current environment. For example, the localization system 185 can utilize sensor data 140 in a processing pipeline that includes estimating the current geographical position of the vehicle 105 based on image data. In this manner, the vehicle 105 can recover its position within its current environment, for instance, in the case that the vehicle 105 fails to track its pose due to sensor outages, algorithm failures, etc.

The autonomy computing system 130 can include a perception system 155, a prediction system 160, a motion planning system 165, and/or other systems that cooperate to perceive the surrounding environment of the vehicle 105 and determine a motion plan for controlling the motion of the vehicle 105 accordingly. For example, the autonomy computing system 130 can obtain the sensor data 140 from the vehicle sensor(s) 125, process the sensor data 140 (and/or other data) to perceive its surrounding environment, predict the motion of objects within the surrounding environment, and generate an appropriate motion plan through such surrounding environment. The autonomy computing system 130 can communicate with the one or more vehicle control systems 135 to operate the vehicle 105 according to the motion plan.

The vehicle computing system 100 (e.g., the autonomy computing system 130) can identify one or more objects that are proximate to the vehicle 105 based at least in part on the sensor data 140 and/or the map data 145. For example, the vehicle computing system 100 (e.g., the perception system 155) can process the sensor data 140, the map data 145, etc. to obtain perception data 170. The vehicle computing system 100 can generate perception data 170 that is indicative of one or more states (e.g., current and/or past state(s)) of a plurality of objects that are within a surrounding environment of the vehicle 105. For example, the perception data 170 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 155 can provide the perception data 170 to the prediction system 160, the motion planning system 165, and/or other system(s).

The prediction system 160 can be configured to predict a motion of the object(s) within the surrounding environment of the vehicle 105. For instance, the prediction system 160 can generate prediction data 175 associated with such object(s). The prediction data 175 can be indicative of one or more predicted future locations of each respective object. For example, the prediction system 160 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175 can be indicative of the speed and/or acceleration at which the respective object is predicted to travel along its associated predicted motion trajectory. The prediction system 160 can output the prediction data 175 (e.g., indicative of one or more of the predicted motion trajectories) to the motion planning system 165.

The vehicle computing system 100 (e.g., the motion planning system 165) can determine a motion plan 180 for the vehicle 105 based at least in part on the perception data 170, the prediction data 175, and/or other data. A motion plan 180 can include vehicle actions (e.g., planned vehicle trajectories, speed(s), acceleration(s), other actions, etc.) with respect to one or more of the objects within the surrounding environment of the vehicle 105 as well as the objects' predicted movements. For instance, the motion planning system 165 can implement an optimization algorithm, model, etc. that considers cost data associated with a vehicle action as well as other objective functions (e.g., cost functions based on speed limits, traffic lights, etc.), if any, to determine optimized variables that make up the motion plan 180. The motion planning system 165 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the motion planning system 165 can evaluate one or more of the predicted motion trajectories of one or more objects during its cost data analysis as it determines an optimized vehicle trajectory through the surrounding environment. The motion planning system 165 can generate cost data associated with such trajectories. In some implementations, one or more of the predicted motion trajectories may not ultimately change the motion of the vehicle 105 (e.g., due to an overriding factor). In some implementations, the motion plan 180 may define the vehicle's motion such that the vehicle 105 avoids the object(s), reduces speed to give more leeway to one or more of the object(s), proceeds cautiously, performs a stopping action, etc.

The motion planning system 165 can be configured to continuously update the vehicle's motion plan 180 and a corresponding planned vehicle motion trajectory. For example, in some implementations, the motion planning system 165 can generate new motion plan(s) for the vehicle 105 (e.g., multiple times per second). Each new motion plan can describe a motion of the vehicle 105 over the next planning period (e.g., next several seconds). Moreover, a new motion plan may include a new planned vehicle motion trajectory. Thus, in some implementations, the motion planning system 165 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 100 can cause the vehicle 105 to initiate a motion control in accordance with at least a portion of the motion plan 180. A motion control can be an operation, action, etc. that is associated with controlling the motion of the vehicle. For instance, the motion plan 180 can be provided to the vehicle control system(s) 135 of the vehicle 105. The vehicle control system(s) 135 can be associated with a vehicle controller (e.g., including a vehicle interface) that is configured to implement the motion plan 180. The vehicle controller can, for example, translate the motion plan into instructions for the appropriate vehicle control component (e.g., acceleration control, brake control, steering control, etc.). By way of example, the vehicle controller can translate a determined motion plan 180 into instructions to adjust the steering of the vehicle 105 "X" degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 180 (e.g., by sending control signal(s), making the translated plan available, etc.). This can allow the vehicle 105 to autonomously travel within the vehicle's surrounding environment.

As discussed above, the vehicle computing system 100 can include a localization system 185. The localization system 185 can determine a location of vehicle 105 based on image data, as described in greater detail herein. In some implementations, the localization system 185 can be configured to operate in conjunction with the positioning system 150. For example, the localization system 185 can send data to and receive data from the vehicle positioning system 150. In some implementations, the localization system 185 can be included in or otherwise a part of a positioning system 150. The localization system 185 can include software and hardware configured to provide the functionality described herein. In some implementations, the localization system 185 can be implemented as a subsystem of a vehicle computing system 100. Additionally, or alternatively, the localization system 185 can be implemented via one or more computing devices that are remote from the vehicle 105. Example localization system 185 configurations according to example aspects of the present disclosure are discussed in greater detail with respect to FIGS. 2-8.

The operator 106 can be associated with the vehicle 105 to take manual control of the vehicle, if necessary. For instance, in a testing scenario, a vehicle 105 can be periodically tested with controlled faults that can be injected into an autonomous vehicle's autonomy system 130. This can help the vehicle's response to certain scenarios. A vehicle operator 106 can be located within the vehicle 105 and/or remote from the vehicle 105 to take control of the vehicle 105 (e.g., in the event the fault results in the vehicle exiting from a fully autonomous mode in the testing environment).

Although many examples are described herein with respect to autonomous vehicles, the disclosed technology is not limited to autonomous vehicles. Any vehicle 105 may utilize the technology described herein for determining a location based on image data. In fact, any object capable of collecting an image depicting its surrounding environment can utilize the technology described herein for determining a location based on image data. For example, a non-autonomous vehicle may utilize aspects of the present disclosure to determine its location within its surrounding environment. Likewise, a smart phone with one or more cameras can utilize aspects of the present disclosure to determine its location within its surrounding environment.

Figure 2:
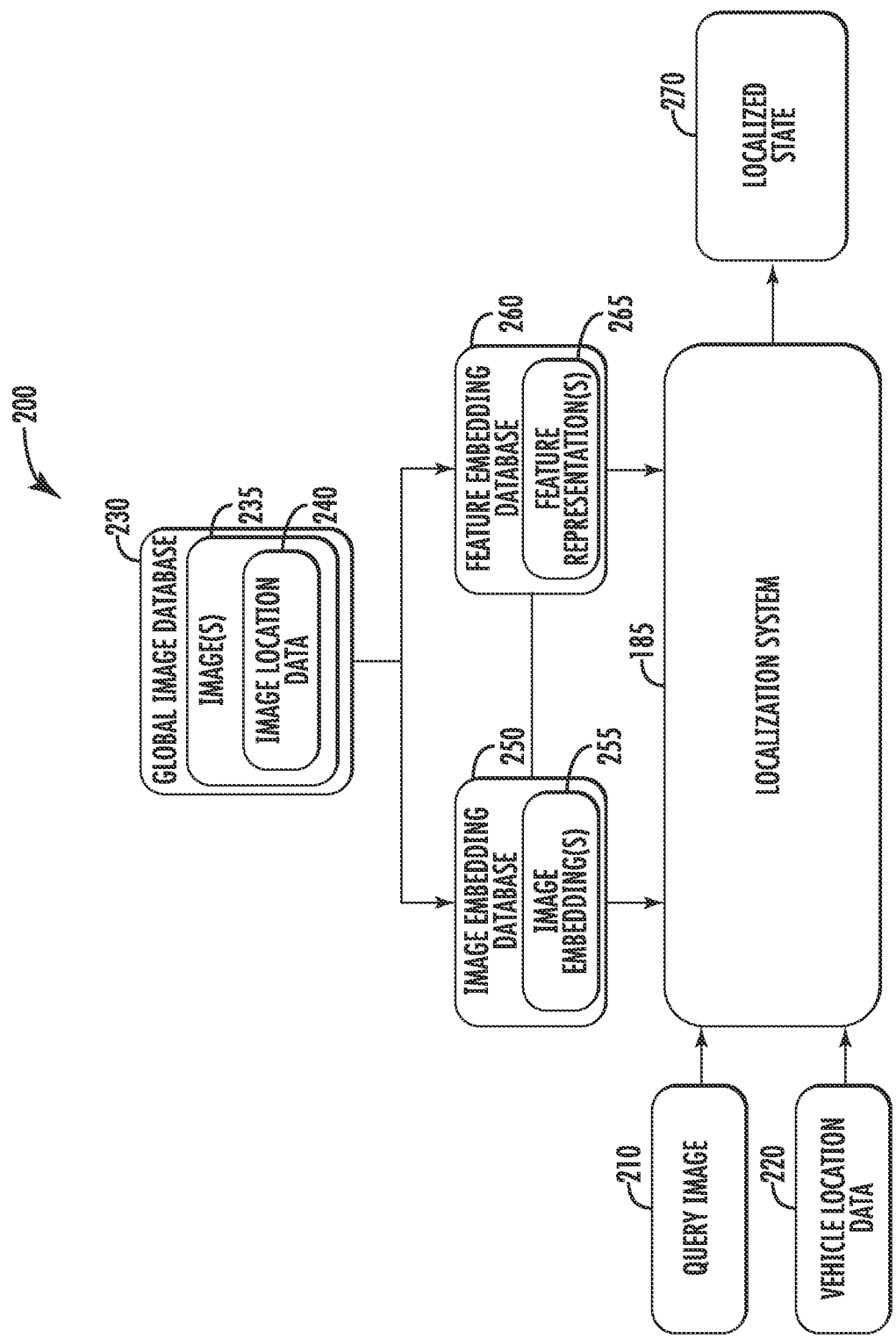
FIG. 2 depicts an example data flow diagram for determining a localized state of a vehicle based on image data according to example implementations of the present disclosure.

FIG. 2 depicts an example data flow diagram for determining a single location estimate 270 of a vehicle 105 based on image data according to example implementations of the present disclosure. The localization system 185 can determine a single location estimate 270 based, at least in part, on a query image 210, vehicle location data 220, image embedding(s) 255, and/or feature representations(s) 265. As discussed in greater detail below, the localization system 185 can receive a query image 210 and vehicle location data 220 from one or more sensor(s) 125 onboard vehicle 105 (e.g., an autonomous vehicle). In addition, the localization system 185 can obtain one or more image embedding(s) 255 from image embedding database 250 and/or one or more feature representation(s) 265 from feature embedding database 260.

More particularly, the localization system 185 can obtain sensor data 140 associated with vehicle 105 from the computing system 100 and/or one or more sensor(s) 125. For example, the one or more sensor(s) 125 (e.g., cameras) can collect image data associated with the surrounding environment of vehicle 105. For instance, the vehicle computing system 100 can collect one or more query image(s) 210 depicting a surrounding environment of the vehicle 105 via the one or more sensor(s) 125 (e.g., cameras). The localization system 185 can receive the one or more of the query image(s) 210 depicting the surrounding environment of the vehicle 105 from vehicle computing system 100. In addition, or alternatively, the localization system 185 can receive one or more query image(s) 210 depicting the surrounding environment of the vehicle 105 directly from one or more sensor(s) 125 (e.g., cameras) onboard the vehicle 105.

The localization system 185 can obtain vehicle location data 220 associated with the vehicle 105. For example, the vehicle computing system 100 can collect vehicle location data 220 via one or more sensor(s) 125 (e.g., GPS sensors, IMUs, etc.) onboard the vehicle 105. The localization system 185 can receive the vehicle location data 220 from the vehicle computing system 100, one or more of sensor(s) 125 onboard the vehicle 105, or both. The vehicle location data 220 can include a geolocation and/or a heading angle. In some implementations, the vehicle location data 220 can include Global Positioning System coordinates (e.g., GPS coordinates). For instance, the localization system 185 can obtain a coarse GPS estimate (e.g., from the vehicle computing system 100, one or more sensor(s) 125 onboard the vehicle 105, etc.) including geolocation coordinates and/or a heading angle associated with the vehicle 105.

The localization system 185 can access an image embedding database 250 to obtain one or more pre-computed image embedding(s) 255. For example, the image embedding database 250 can include one or more databases of pre-computed image embedding(s) each including a plurality of pre-computed image embedding(s) 255 (e.g., a separate database can be maintained for each city, zip code, etc.). The image embedding database 250 can be stored onboard the vehicle 105, remotely from the vehicle 105 (e.g., in one or more remote servers, in operations computing system 190, etc.), or distributed on both the vehicle 105 and one or more remote servers (e.g., operations computing system 190). For example, in some implementations, the image embedding database 250 is stored remote from the vehicle 105 in one or more remote servers such as operations computing system 190. In such an implementation, the localization system 185 can communicate, via one or more communication systems 120 onboard the vehicle 105, with the one or more remote servers such as operations computing system 190 to access the image embedding database 250.

The plurality of pre-computed image embeddings 255 can be previously computed for a plurality of images 235 in a global image database 230 by a machine-learned image embedding model. Each image embedding can include one or more latent image descriptors associated with a respective image from global image database 230. By way of example, the machine-learned image embedding model can be configured to generate an image embedding including one or more vectors of latent image descriptors corresponding to a respective image. In some implementations, each of the plurality of images 235 in the global image database 230 can be input into the machine-learned image embedding model to obtain a respective image embedding for each of the plurality of images 235 in the global image database 230.

The global image database 230 can include one or more image databases each including a plurality of images 235 (e.g., a separate database can be maintained for each city, zip code, etc.). The global image database 230 can be stored onboard vehicle 105, remote from the vehicle 105 (e.g., in one or more remote servers, operations computing system 190, etc.), or distributed on both the vehicle 105 and one or more remote servers, such as operations computing system 190. For example, in some implementations, the global image database 230 can be stored in one or more servers remote from the vehicle 105 (e.g., in an operations computing system 190).

The global image database 230 can include a large scale visual localization dataset of labeled images previously collected by one or more vehicles. For example, the plurality of images 235 can be previously collected by one or more vehicles utilizing a self-driving platform. The self-driving platform can carry, among other sensors, a LIDAR, RADAR, one or more cameras, a GPS, a wheel odometer, and/or an inertial measurement sensor ("IMU"). For example, in some implementations, the plurality of images 235 can be previously collected by one or more vehicles equipped with a LIDAR sensor, wheel odometer, and an IMU. The global image database 230 can include a plurality of images collected for each of a plurality of vehicle trips across at least one city. In some implementations, the plurality of vehicle trips can span all seasons, diverse weather conditions (e.g., rain, snow, etc.), and multiple times of day (e.g., times with ample light, low natural lighting, etc.). In this manner, the global image database 230 can include a dataset of images that are diverse (e.g., in visual appearance due to weather conditions, seasons, illumination, etc.), scalable, and accurate (e.g., provides clear benchmarks).

By way of example, the global image database 230 can include a plurality of images 235 previously collected during a total of 214 vehicle trips across one North American city. For instance, the plurality of images 235 can cover over 25,000 kilometers of a total travelled distance. The plurality of images 235 can be taken at 10 frames per second, for example, via a frontal 2 Mega-Pixel camera for localization. By way of example, the plurality of images can be captured by an HD, global-shutter, color camera located in the roof of the vehicle, facing forward at all times. This, in turn, can provide images at a resolution of 1920×1200 pixels. In addition, in some implementations, the cameras can be configured such that the horizontal and vertical fields of view for each image in the plurality of images are 78.58° and 52.49°, respectively. In this manner, the global image database 230 can be configured to include at least one image database with over 9.1 million images corresponding to a single city. In some implementations, the plurality of images 235 in the global image database 230 can be downsampled to a size of 300×480 pixels. The size can be larger than other sizes used in image classification benchmarks but preserves fine details necessary for relative pose estimation.

The global image database 230 includes image location data 240 corresponding to each image in the global image database 230. In this manner, each image in the global image database 230 can be associated with image location data. For example, each image in the global image database 230 can be associated with a respective geolocation and a respective heading angle. By way of example, each image in the global image database 230 can be associated with respective geo-location coordinates (e.g., GPS coordinates). The image location data 240 can be previously computed for each image in global image database 230. For example, in some implementations, a ground truth pose can be pre-computed for each image using an accurate point-cloud LIDAR-based method. The poses can be geo-registered to Universal Transverse Mercator (UTM) coordinates.

In some implementations, each of the plurality of pre-computed image embeddings 255 can be associated with image location data 240. For example, each of the plurality of pre-computed image embeddings 255 can be associated with image location data 240 associated with a respective image in the global image database 230. By way of example, a respective image embedding can be associated with the image location data 240 associated with an image utilized to pre-compute the respective image embedding.

The localization system 185 can access a feature embedding database 260 to obtain one or more feature representation(s) 265. For example, the feature embedding database 260 can include one or more databases of pre-computed feature representation(s) each including a plurality of pre-computed feature representation(s) 265 (e.g., a separate database can be maintained for each city, zip code, etc.). The feature embedding database 260 can be stored in memory onboard the vehicle 105, remote from the vehicle 105 (e.g., in one or more remote servers, operations computing system 190, etc.), or both. For example, in some implementations, the feature embedding database 260 can be stored in one or more servers remote from the vehicle 105, such as operations computing system 190. In such a case, the localization system 185 can communicate, via one or more communication systems 120 onboard the vehicle 105, with the one or more remote servers, such as operations computing system 190) to obtain one or more of the plurality of feature representation(s) 265 from the feature embedding database 260.

The plurality of pre-computed feature representation(s) 265 can be previously computed for the plurality of images 235 in the global image database 230 by a machine-learned feature embedding model. Each respective feature representation can include the information necessary for sub-meter pose estimation based on a respective image. For instance, the respective feature representation for a respective image can include one or more global image descriptors corresponding to the respective image. The global image descriptors can identify image characteristics associated with the image that are necessary for sub-meter pose estimation. The resulting feature representation can provide a deeper analysis of a respective image than an image embedding associated with the respective image. Thus, as described in further detail below, a feature representation can be utilized to provide an accurate single location estimate 270 based on image characteristics.

Each of the plurality of image embeddings 255 in image embedding database 250 and each of the plurality of feature representations 265 in the feature embedding database 260 are associated with at least one of the plurality of images 235 in the global image database 230. For example, each feature representation in the feature embedding database 260 is associated with a respective image utilized to pre-compute the feature representation. Similarly, each image embedding in the image embedding database 250 is associated with a respective image utilized to pre-compute the image representation. In this fashion, each feature representation in the feature embedding database 260 can be associated with a respective image embedding in the image embedding database 250 based on the image associated with the feature representation and the respective image embedding.

The localization system 185 can output a single location estimate 270 based at least in part on the query image 210, vehicle location data 220, one or more image embedding(s) 255, and/or one or more feature representation(s) 265. For example, in some implementations, the localization system 185 can obtain a feature representation for a respective image associated with a respective image embedding. The localization system 185 can determine a single location estimate 270 based at least in part on the respective image, the respective image embedding, the feature representation for the respective image associated with the respective image embedding, and/or other data such as sensor data 140. For example, as discussed in further detail with respect to FIG. 3, the localization system 185 can determine a single location estimate 270 based on a relative displacement between the feature representation for the respective image associated with the respective image embedding and the query image 210.

Figure 3:
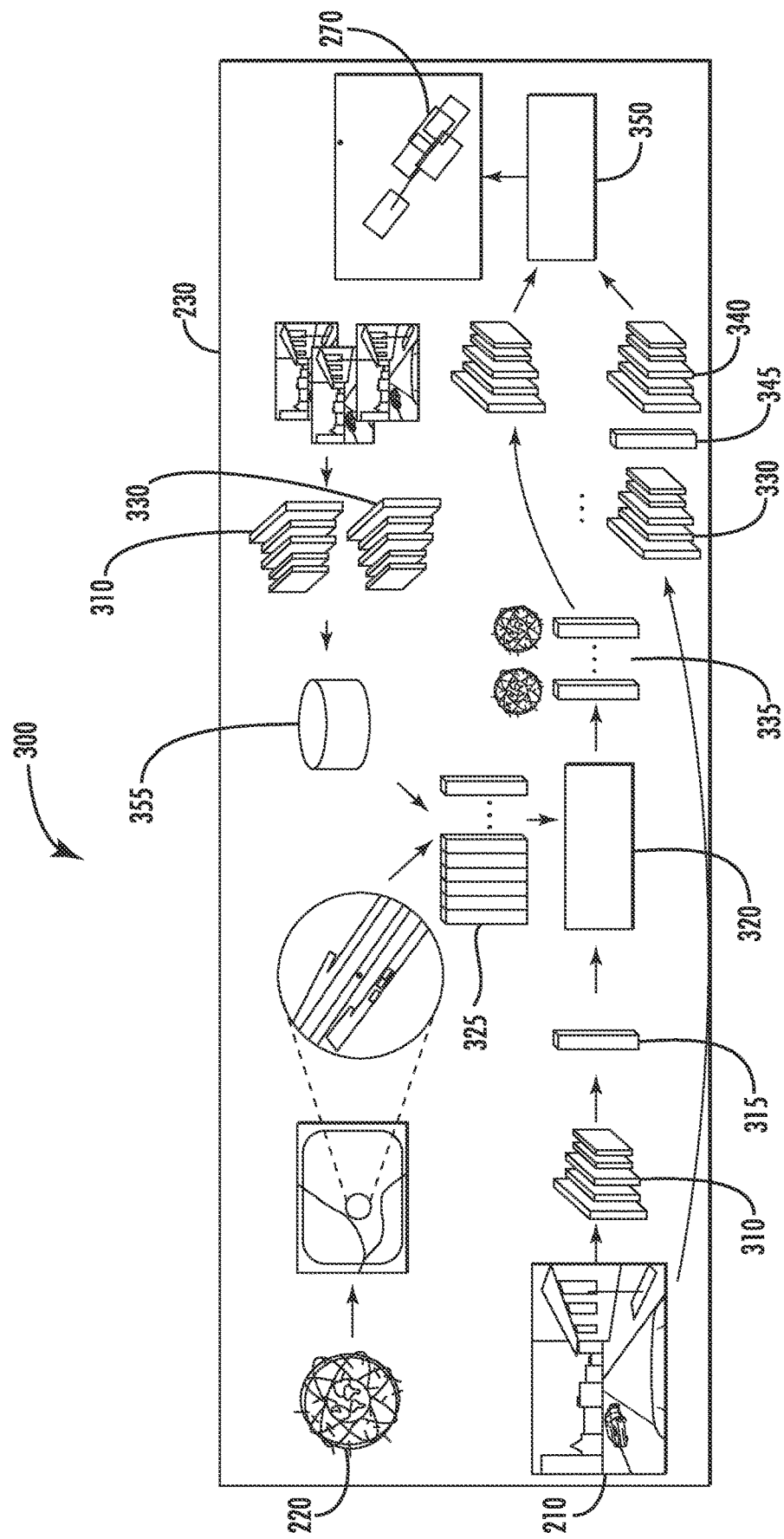
FIG. 3 depicts an example network diagram for determining a localized state of an autonomous vehicle based on image data according to example implementations of the present disclosure.

Turning to FIG. 3, FIG. 3 depicts an example network diagram 300 for determining a single location estimate 270 of a vehicle 105 based on image data according to example implementations of the present disclosure. In particular, and as described in further detail below, FIG. 3 depicts a two-stage procedure for determining an accurate location estimate. In a first stage, image embeddings are retrieved using vehicle location data 220 and a learned deep matching function (e.g., machine-learned image embedding model 310). In a second stage, relative pose estimates are computed from the feature representations associated with the retrieved image embeddings and aggregated to produce a single localized state. The procedure is designed such that all operations between a query image 210 and the plurality of images in the global image database 230 utilize learned image descriptors such as image embeddings and/or feature representations as inputs. This, in turn, minimizes the memory footprint onboard vehicle 105 by allowing the localization system 185 to navigate between images utilizing pre-computed descriptors rather than the images themselves.

More particularly, the localization system 185 can input at least one query image 210 into a machine-learned image embedding model 310 to receive a query embedding 315 as an output of the machine-learned image embedding model 310. The query embedding 315 can include one or more latent image descriptors associated with the query image 210. By way of example, the machine-learned image embedding model 310 can be configured to generate a query embedding 315 including one or more vectors of latent image descriptors corresponding to the query image 210. For example, the latent image descriptors corresponding to the query image 210 can match one or more latent image descriptors described above with reference to the precomputed image embeddings.

The machine-learned image embedding model 310 can include one or more machine-learned models (e.g., neural network, convolutional neural network, etc.) stored in memory onboard the vehicle 105, in one or more remote servers (e.g., operations computing system 190), or distributed on both the vehicle 105 and one or more remote servers (e.g., operations computing system 190). For example, the machine-learned embedding model 310 can utilize a ResNet-50 architecture as its backbone. In this example, the machine-learned image embedding model 310 is utilized by vehicle 105 (e.g., by onboard vehicle computing system 100, localization system 185, etc.) and a remote server (e.g., operations computing system 190) to generate a query embedding 315 and a plurality of pre-computed image embeddings, respectively. For instance, the vehicle 105 or, more particularly, the vehicle computing system 100 and/or the localization system 185 input the query image 210 into machine-learned image embedding model 310 to receive a query embedding 315 associated with the query image 210. In addition, a remote server, such as, for example, the operations computing system 190 can have previously input each of the plurality of images in global image database 230 into the machine-learned image embedding model 310 to receive a respective image embedding associated with each image in the global image database 230.

The machine-learned image embedding model 310 can be previously trained via one or more machine learning techniques using one or more images as constraints. In some implementations, the machine-learned image embedding model 310 can be trained via a triplet training scheme utilizing a plurality of image triplets. For example, the machine-learned image embedding model 310 can be previously trained on one or more remote servers, such as the operations computing system 190 using the plurality of images from the global image database 230. For instance, each of the plurality of image triplets can include three images collected from the global image database 230.

Each of the plurality of image triplets can be input into the machine-learned image embedding model 310 to learn the machine-learned image embedding model 310. For example, the machine-learned image embedding model 310 can be learned by minimizing a triplet loss function (e.g., through performance of backpropagation techniques). By way of example, the learning of the machine-learned embedding model 310 can be formulated as a minimization problem, such as:

$$\ell_{retrieve} = \max\{m + d(f(x_a), f(x_p)) - d(f(x_a), f(x_n)), 0\}$$

where $x_a$, $x_p$, and $x_a$ are all images, and are collectively called a "triplet." In particular, $x_a$ is an anchor image, $x_p$ is a positive image, $x_a$ is a negative image, and m is a static, preset value. For example, in some implementations, m can be set to 0.5. The machine-learned image embedding model 310 can be previously trained using a triplet training scheme over some or all of the plurality of images included in the global image database 230. For example, a respective image triplet can be collected for each image in the global image database 230. By way of example, each image in the global image database 230 can correspond to an anchor image in at least one respective image triplet. Moreover, in some implementations, each image in a respective image triplet can include an anchor image, positive image, and negative image previously obtained from a different vehicle trip. In this manner, the machine-learned image embedding model 310 can be trained to be invariant to factors such as time of day, weather, dynamic objects in a scene, etc.

The respective anchor image, the respective positive image, and the respective negative image in each image triplet can be based on the image location data associated with each image in the global image database 230. For example, each image triplet in the plurality of image triplets can include an anchor image associated with a respective geolocation that is closer to the respective geolocation associated with the positive image than the respective geolocation associated with the negative image. By way of example, a Euclidean distance can be determined between each image in the global image database 230 based on the geolocation coordinates associated with each image in the global image database 230. Each image triplet in the plurality of image triplets can include an anchor image and a positive image associated with a Euclidean distance that is lower than the Euclidean distance between the anchor image and a negative image. In this manner, each image triplet can include one or more images such that the distance between the respective geolocation associated with the positive image and the respective geolocation associated with the anchor image is less than the distance between the respective geolocation associated with the negative image and the respective geolocation associated with the anchor image.

In some implementations, the respective distance between the positive image and the anchor image can be less than the respective distance between the negative image and the anchor image by a threshold distance. The threshold distance can be a dynamically determined distance and/or a predetermined distance. For example, the threshold distance can be a dynamic distance based on the geolocations associated with each image in the global image database 230. In addition, or alternatively, the threshold distance can be a static, predetermined distance, such as, for example, a pre-defined margin set before training. By way of example, in some implementations, the Euclidean distance between the anchor image and the positive image in a respective image triplet can be within 1 meter, whereas the Euclidean distance between the anchor image and the negative image can be within 2 to 4 meters. In this manner, the effectiveness of triplet training scheme can be altered by changing the threshold distance before and/or during training.

In addition, or alternatively, each image triplet in the plurality of image triplets can include a positive image and/or a negative image associated with a respective heading angle within the respective heading angle of the anchor image by a heading threshold. For example, the heading threshold can be a dynamically determined threshold based on the respective heading angle associated with each image in the global image database 230. In some implementations, the heading threshold can be a static, pre-determined angle. For example, the heading threshold can be a predetermined angle to ensure that each image triplet in the plurality of image triplets includes a positive image/negative image and an anchor image with overlapping fields of view. For example, in some implementations each image triplet can include a positive image, negative image, and anchor image associated with heading angles within a range of $\pi = 30°$.

The localization system 185 obtains a plurality of candidate embeddings 325 from the plurality of pre-computed image embeddings in the image embedding database. The plurality of candidate embeddings can be stored in memory onboard the vehicle 105, such as in an onboard embedding database 355, remote from the vehicle 105, such as in operations computing system 190 and/or both. In this example, the plurality of candidate embeddings are received from the image embedding database and stored onboard vehicle 105 in onboard embedding database 355. However, it should be noted that the plurality of candidate embeddings 325 can also be stored remote from vehicle 104, such as in operations computing system 190.

The localization system 185 obtains the plurality of candidate embeddings 325 based at least in part on vehicle location data 220 associated with the vehicle 105 and image location data associated with each image in the global image database 230. In this manner, the localization system can adopt a filter-by-retrieval scheme that prunes uninformative image embeddings quickly while avoiding redundancy. For example, the localization system 185 can obtain the plurality of candidate embeddings 325 based on the image location data associated with a respective image associated with each image embedding. In some implementations, the localization system 185 can compare the vehicle location data 220 with image location data to determine one or more candidate embedding(s) from the plurality of image embeddings within a threshold distance of the geolocation coordinates of the vehicle location data 220.

For example, the localization system 185 can obtain the plurality of candidate embeddings 325 based on a distance between the geolocation coordinates associated with the vehicle 105 and the geolocation coordinates associated with each of image in the global image database 230. For instance, the localization system 185 can collect a plurality of candidate embeddings (e.g., $D_g$) that are within $\tau$ meters from the vehicle location data 220 (e.g., G):

$$\mathcal{D}_G = \{(x_i, y_i) \in \mathcal{D} \mid d(y_i, G) < \tau\}$$

where $d(\cdot, \cdot)$ is the Euclidean distance. By way of example, the localization system 185 can determine a Euclidean distance between the geolocation coordinates associated with the vehicle 105 and the geolocation coordinates associated with each image in the image embedding database. The localization system 185 can obtain the plurality of candidate embeddings 325 based on the Euclidean distance between the geolocation coordinates associated with the vehicle 105 and the geolocation coordinates associated with the image associated with each image embedding.

The localization system 185 can obtain the plurality of candidate embeddings 325 from the plurality of pre-computed image embeddings associated with a respective distance below a threshold distance (e.g., $\tau$). This can be done efficiently, for example, by utilizing a t-dimensional tree. The threshold distance can be any distance from the geolocation coordinates associated with the vehicle 105. In some implementations, the threshold distance can be a tunable hyperparameter set based on an empirical error of the vehicle location data 220. For example, the threshold distance can include a ten-meter radius around the geolocation coordinates associated with the vehicle 105. For instance, the plurality of candidate embeddings 325 can include one or more of the plurality of pre-computed image embeddings from the image embedding database that are associated with an image associated with geolocation coordinates within ten-meters of the geolocation coordinates associated with the vehicle 105.

Alternatively, rather than using a fixed threshold distance, a certain number (e.g., 500) of pre-computed image embeddings associated with the closest images can be determined. For example, five hundred candidate embeddings can be obtained based on five hundred images from the global image database 230 associated with image location data closest to the vehicle location data 220.

In some implementations, the localization system can downsample the plurality of candidate embeddings 325. For example, the localization system 185 can uniformly downsample the plurality of candidate embeddings 325 at random to obtain a fixed number of candidate embeddings. By way of example, the localization system 185 can remove a random candidate embedding from the plurality of candidate embeddings 325 to obtain a fixed number of candidate embeddings. The fixed number of candidate embeddings can be any number of candidate embeddings. For example, the fixed number of candidate embeddings can be determined to increase the processing speed (and/or efficiency) of the localization system 185. By way of example, in some implementations, the plurality of candidate embeddings 325 can be downsampled at random to obtain two hundred and fifty candidate embeddings.

The localization system 185 can compare the query embedding 315 to the plurality of candidate embeddings 325 to identify a subset of candidate embeddings 335 that have embeddings that satisfy a threshold. Comparing the query embedding 315 to the plurality of candidate embeddings 325 can include performing a k-nearest neighbor retrieval 320 over the plurality of candidate embeddings 325. By way of example, the localization system 185 performs a k-nearest neighbor retrieval 320 over the plurality of candidate embeddings 325 based on the query embedding 315. Each candidate embedding in the plurality of candidate embeddings 325 is scored based on a respective similarity between the respective candidate embedding and the query embedding 315. The localization system 185 obtains the top scoring candidate embeddings in the plurality of candidate embeddings 325. For example, the localization system 185 can identify the candidate embeddings that scored above a threshold similarity score. In this manner, the k-nearest neighbor retrieval 320 can identify a subset of candidate embeddings 335 most similar to the query embedding 315.

More particularly, in some implementations, the localization system 185 evaluates every latent image descriptor in each image embedding in the plurality of candidate embeddings 325 against every latent image descriptor in the query embedding 315. The localization system 185 can collect the top k scoring candidates in a new dataset $D_1$ (e.g., the subset of candidate embeddings 335). For example:

$$\mathcal{D}_\mathcal{I} = k \text{ argmax}(\{\|f(x_i) - f(\mathcal{I})\|_2 \mid \forall x_i \in G\})$$

where k argmax is a top-k selection operator over a set with a distance measure. In this manner, the localization system 185 can conduct a k-nearest neighbor retrieval 320 in feature space (e.g., using latent image descriptors). Other search/comparison techniques can be performed as well, including, for example, identifying a subset of candidate embeddings 335 with the smallest L2 norm relative to the query embedding 315.

Descriptions provided herein which describe scores "above" or "below" a threshold and/or refer to "top-scoring" items are dependent upon the convention used to represent the score. In the provided examples, similarity scores with larger magnitude are indicative of more similar pairs of embeddings. However, the opposite convention may be used and, therefore, embeddings with the smallest scores could be selected. In general, regardless of convention used, the localization system 185 can operate to identify candidate embeddings 335 that are most similar to the query embedding 315.

The subset of candidate embeddings 335 can include any number of the plurality of candidate embeddings 325. In some implementations, the number of candidate embeddings included in the subset can be predetermined to increase the speed and efficiency of localization system 185. For example, in some implementations, the subset of candidate embeddings 335 can include five candidate embeddings that are most similar to the query embedding 185. For example, the subset of candidate embeddings 335 can include five candidate embeddings that scored the highest relative to the threshold similarity score. The localization system 185 can determine a single location estimate 270 for the vehicle 105 based on the image location data associated with the respective image associated with each candidate embedding in the subset of candidate embeddings 335. Thus, the candidate embeddings that satisfy a threshold can include all embeddings that have a similarity score greater than a threshold amount or can include a certain pre-defined number of embeddings that have the relative maximum similarity scores.

The localization system 185 obtains a respective feature representation for the query image 210 and a respective feature representation for each image associated with each of the candidate embeddings in the subset of the candidate embeddings 335. More particularly, the localization system 185 obtains a query feature representation 345 that includes one or more global image descriptors associated with the query image 210. To do so, the localization system 185 inputs the query image 210 into a machine-learned feature extraction model 330 to obtain a query feature representation 345. The query feature representation 345 can include one or more feature vectors associated with the query image 210. The feature vectors can include one or more visual descriptors. In this manner, the machine-learned feature extraction model 330 can output one or more global image descriptors associated with query image 210.

The machine-learned feature extraction model 330 can include one or more machine-learned models. For example, the machine-learned embedding model can utilize a ResNet-50 architecture as its backbone. In some implementations, the machine-learned feature extraction model 330 can be used as part of a Siamese embedding structure. By way of example, the machine-learned feature extraction model 330 can include a neural network architecture with one or more subnetworks. In some implementations, the subnetworks can include similar parameters and weights. The machine-learned feature extraction model 330 or, for example, a subnetwork of the machine-learned feature extraction model 330 can be stored in memory onboard the vehicle 105, remote from the vehicle 105, for example, on one or more remote servers, such as, the operations computing system 190, or distributed on both the vehicle 105 and one or more remote servers, such as, the operations computing system 190. For example, the machine-learned feature extraction model 330, or a subnetwork of the machine-learned feature extraction model 330 can be stored in memory onboard the vehicle 105 and, remote from the vehicle 105 in one or more remote servers, such as operations computing system 190. The machine-learned feature extraction model 330 can be utilized by the vehicle 105 and a remote server, such as operations computing system 190 to output feature representations for one or more input images. By way of example, the vehicle 105 via, for example, the vehicle computing system 100 and/or localization system 185, can input the query image 210 into the machine learned feature extraction model 330 to obtain the query feature representation 345. In addition, the one or more remote servers, such as the operations computing system 190 can input each of the plurality of images in the global image database 230 into the machine-learned feature extraction model 330 to receive a respective feature representation associated with each image in the global image database 230.

The localization system 185 can determine a set of relative displacements associated with the subset of the candidate embeddings 335. The set of relative displacements can include a respective relative displacement between the query image 210 and each of a plurality of candidate image(s). Each candidate image in the plurality of candidate images can be associated with a candidate embedding in the subset of candidate embeddings 335. For example, a candidate image associated with a candidate embedding can include the respective image from the global image database 230 associated with the candidate embedding. The localization system 185 can regress the set of relative displacements based on the query feature representation 345 for the query image 210 and the respective feature representation for each candidate image in the plurality of candidate images. For example, the localization system 185 can regress the set of relative displacements based on the query feature representation 345 for the query image 210 and the respective feature representation for each respective image from the global image database 230 associated with a candidate embedding in the subset of candidate embeddings 335.

By way of example, the localization system 185 can input the query feature representation 345 and a respective feature representation for a candidate image associated with a candidate embedding in the subset of candidate embeddings 335 into a machine-learned regression model 340. The machine-learned regression model 340 can be configured to determine a respective relative displacement between the query image 210 and the candidate image based, at least in part, on the query feature representation 345 for the query image 210 and the respective feature representation for the candidate image. For instance, the localization system 185 can obtain a respective relative displacement between the query image 210 and the candidate image as an output of the machine-learned regression model 340.

The localization system 185 can utilize the machine-learned regression model 340 to obtain a respective relative displacement for each candidate embedding in the subset of candidate embeddings 335. For example, for each respective candidate embedding in the subset of candidate embeddings 335, the localization system 185 can input the query feature representation 345 and the respective feature representation for a candidate image associated with the respective candidate embedding into the machine-learned regression model 340. In response, the machine-learned regression model 340 can output a respective relative displacement for each candidate embedding in the subset of candidate embeddings 335. In this manner, the localization system 185 can obtain a set of relative displacements including the respective relative displacement between the query image 210 and the candidate image associated with each candidate embedding in the subset of candidate embeddings 335.

The machine-learned regression model 340 can include one or more machine-learned models (e.g., neural network such as convolutional neural network, regression model, etc.). For example, the machine-learned regression model 330 can be designed as a 6-layer Multi-Layer Perception (MLP) with linear layer and Rectified Linear Unit activations. The machine-learned regression model 340 can be stored in memory onboard the vehicle 105, remote from the vehicle 105 in one or more remote servers such as the operations computing system 190, or distributed on the vehicle 105 and one or more remote servers such as the operations computing system 190.

The machine-learned regression model 340 and the machine-learned feature extraction model 330 can be trained jointly and end-to-end via backpropagation. For example, the models can be trained jointly end-to-end on a set of training data. The set of training data can include a plurality of image tuples, each image tuple including a pair of images from the plurality of images in the global image database 230. Each pair of training images can have a known ground truth displacement between the pair of training images. For example, the pair of images can include a first image from the global image database 230 associated with a geolocation that is close to a geolocation associated with a second image from the global image database 230. For instance, each pair of training images can include an anchor image and a positive image (e.g., with a geolocation less than 1 meter from the anchor image). By way of example, the image tuples can include two images associated with similar image location data 240, such as, for example, similar geolocation coordinates (e.g., with some minor displacement). In some implementations, the models can be learned by minimizing the mean squared error between a predicted displacement (e.g., predicted by the machine-learning regression model 340) and the known ground truth displacement:

$$\ell_{regress} = \|\hat{y}_i - y_{GT,i}\|_2^2$$

where $y_{GT,i} = y \ominus y_i$ is the known ground truth displacement expressed in coordinate frame of $x_i$. For example, the $y_{GT,i}$ can include the symmetric difference between y and $y_i$. A set of relative displacements can then be determined using the function:

$$y_i = h(g(x_i), g(\mathcal{I})) \oplus y_i$$

The localization system 185 can determine a single location estimate 270 of the vehicle 105 based at least in part on the set of relative displacements. For example, the localization system 185 can utilize an aggregation function 350 to determine a single location estimate 270 associated with vehicle 105 based on the set of relative displacements. In some implementations, the localization system 185 can utilize an 1-sparse aggregation function that produces the single localization estimate 270. By way of example, each of the respective relative displacements in the set of relative displacements can include displacement location data. The displacement location data can include one or more geolocation coordinates (e.g., a lateral coordinate and/or a longitudinal coordinate) and a heading angle. The localization system 185 can utilize the aggregation function 350 to determine a single location estimate 270 from the displacement location data. By way of example, as described in greater detail with reference to FIG. 7, the aggregation function 350 can include determining one or more median location coordinates and a median heading angle associated with the set of relative displacements.

The localization system 185 can update the localized state of vehicle 105 based on the single location estimate 270. For example, the localization system 185 can communicate, via one or more onboard communication systems 120, with the positioning system 150 to provide data indicative of the single location estimate 270 to the positioning system 150. The positioning system 150 can utilize the single location estimate 270 to update a localized state associated with the vehicle 105 within the environment of the vehicle 105. For example, the positioning system 150 can synthesize the single location estimate 270 from the localization system 185 with other signals indicative of a vehicle location such as the vehicle location data 220 received from one or more sensors 125 including GPS data and/or other sensor measurements. The vehicle computing system 100 can accurately track the vehicle's current location and control the motion of vehicle 105 (e.g., an autonomous vehicle) based at least in part on the localized state of the vehicle 105. For example, the computing system 100 can determine a vehicle route for the vehicle 105 based on the localized state, generate an appropriate motion plan through the vehicle's surrounding environment based on the localized state, etc.

Figure 4:
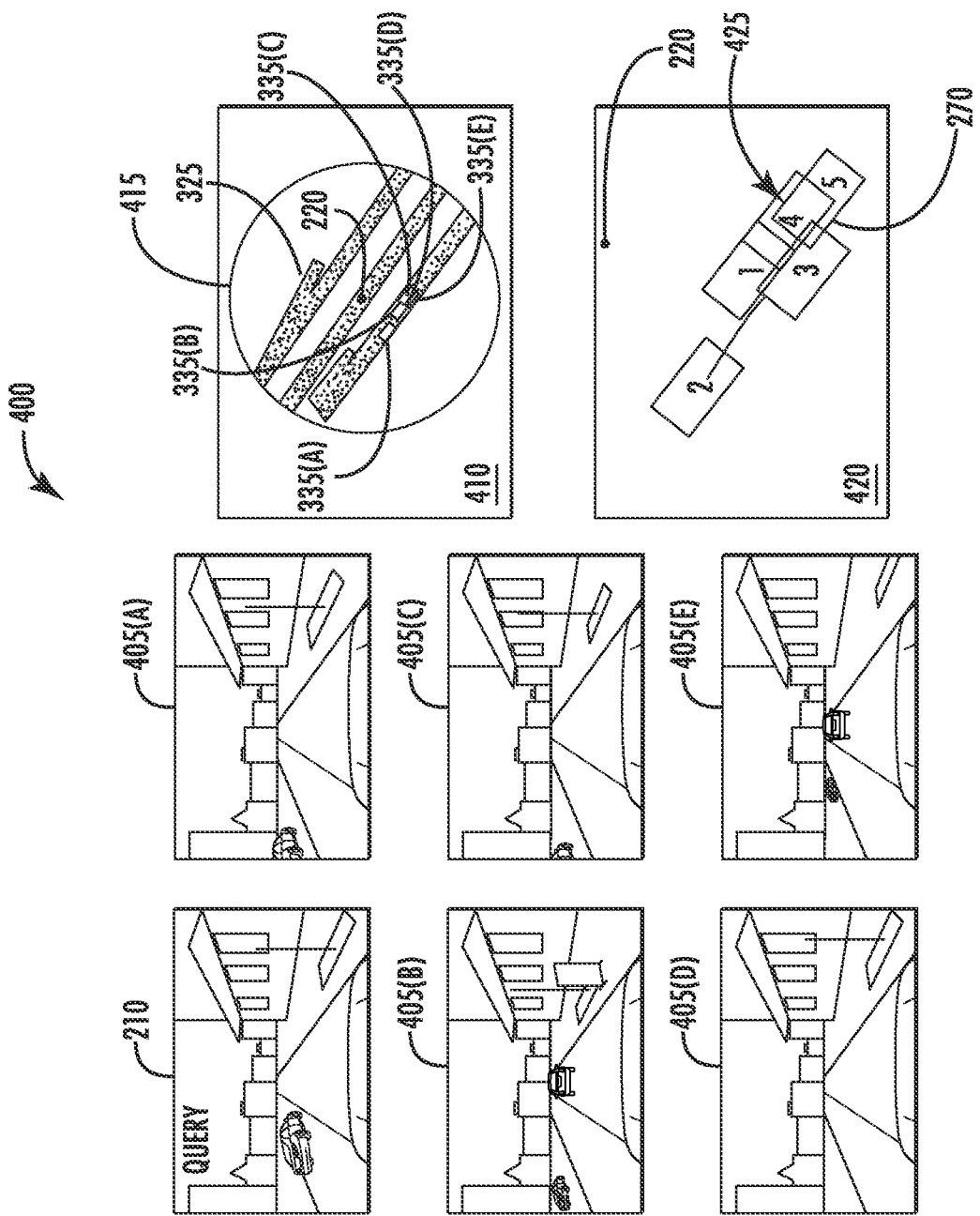
FIG. 4 depicts example images with corresponding location data and image embeddings according to example implementations of the present disclosure.

Turning to FIG. 4, FIG. 4 illustrates example 400 depicting images with corresponding location data according to example implementations of the present disclosure. FIG. 4 illustrates an example query image 210 in relation to example candidate images 405(A-E) corresponding to each candidate embedding in an example subset of candidate embeddings 335(A-E). Query image 210 depicts a portion of an example surrounding environment of vehicle 105. As depicted, example candidate images 405(A-E) each depict portions of a surrounding environment similar to query image 210.

Section 410 of FIG. 4 illustrates respective image locations associated with a plurality of example candidate images associated with a plurality of candidate embeddings 325. As depicted, each of the plurality of candidate embeddings 325 are associated with image location data within a radius 415 of vehicle location data 220. The subset of candidate embeddings 335(A-E) are included in the plurality of candidate embeddings within radius 415 of vehicle location data 220. Noticeably, the image locations associated with the subset of candidate embeddings 335(A-E) are not the closest image locations to vehicle location data 220. Nevertheless, each of the candidate embeddings in the subset of candidate embeddings 335(A-E) are associated with a candidate image (e.g., 405(A-E)) that closely resembles the surrounding environment captured by query image 210.

Section 420 of FIG. 4 depicts a close up of the respective image locations associated with example candidate embeddings 335(A-E) relative to the actual location 425 of vehicle 105 and the single location estimate 270. As depicted, none of the subset of candidate embeddings 335(A-E) are associated with image location data that directly matches the actual location 425. However, the aggregated single location estimate 270 identifies a location closer to the actual location 425 than vehicle location data 220. In this manner, the systems and methods described in the present application can determine a localized state with sub-meter precision.

Figure 5:
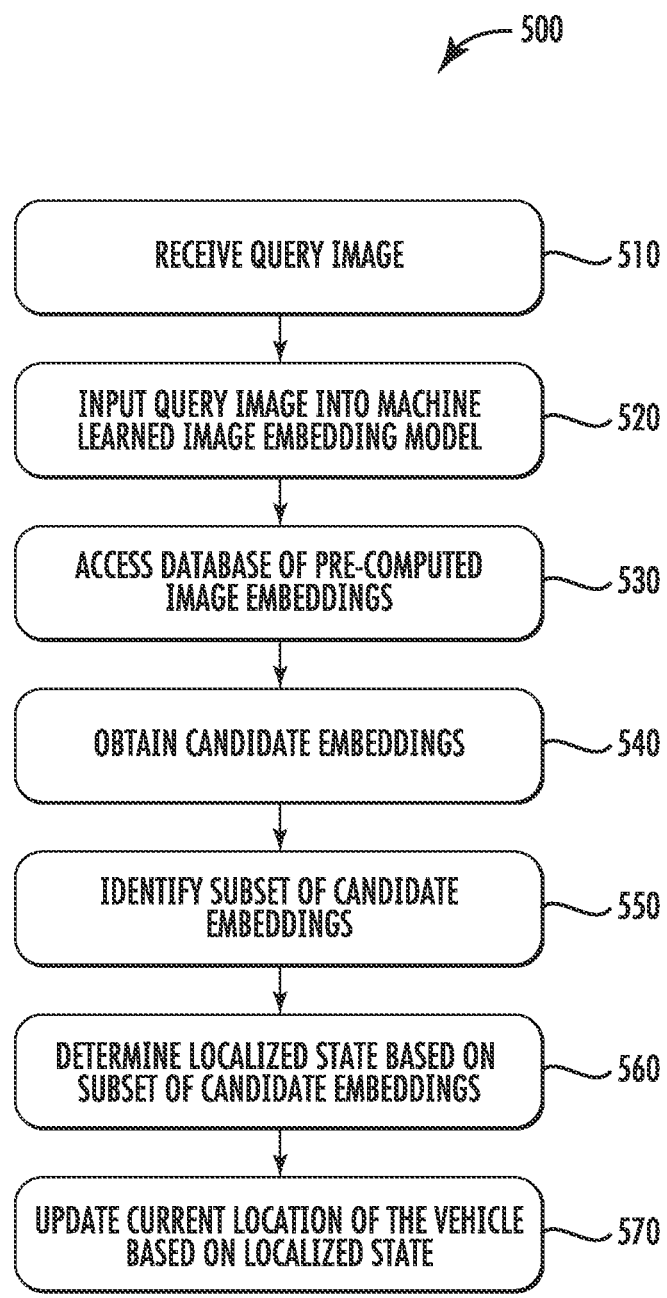
FIG. 5 depicts a flowchart diagram of an example method of determining a localized state of an autonomous vehicle based on image data according to example implementations of the present disclosure.

FIG. 5 depicts a flowchart diagram of an example method 500 of determining a localized state of vehicle 105 based on image data according to example implementations of the present disclosure. One or more portion(s) of the method 500 can be implemented by a computing system that includes one or more computing devices such as, for example, the computing systems described with reference to the other figures (e.g., the vehicle computing system 100, the localization system 185, the operations computing system 190, etc.). Each respective portion of the method 500 can be performed by any (or any combination) of one or more computing devices. Moreover, one or more portion(s) of the method 500 can be implemented as an algorithm on the hardware components of the device(s) described herein (e.g., as in FIGS. 1 and/or 9), for example, to allow a vehicle to determine a location based on image data. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 5 is described with reference to elements/terms described with respect to other systems and figures for example illustrated purposes and is not meant to be limiting. One or more portions of method 500 can be performed additionally, or alternatively, by other systems.

At (510), the method 500 can include receiving a query image 210. For example, the localization system 185 can receive a query image 210 collected by the vehicle 105 (e.g., an autonomous vehicle) and depicting a surrounding environment of the vehicle 105. The localization system 185 can receive the query image 210 from one or more computing systems onboard vehicle 105. By way of example, the vehicle 105 (e.g., an autonomous vehicle) can collect, via one or more vehicle sensors 125, a query image 210 depicting a surrounding environment of the vehicle 105 (e.g., an autonomous vehicle). The localization system 185 can receive the query image 210 from the one or more vehicle sensors 125 (e.g., cameras) onboard vehicle 105.

At (520), the method 500 can include inputting the query image 210 into a machine-learned image embedding model 310. For example, the localization system 185 can input the query image 210 into the machine-learned image embedding model 310 to receive a query embedding 315 as an output of the machine-learned image embedding model 310. In this manner, the localization system 185 can obtain, via the machine-learned image embedding model, a query embedding 315 by inputting the query image 210 into the machine learned image embedding model 310. The machine-learned image embedding model 310 can be stored onboard vehicle 105 (e.g., in vehicle computing system 100, localization system 185, etc.) and/or remote from vehicle 105.

The machine-learned image embedding model 310 can include one or more previously trained machine-learned models. For example, the machine-learned image embedding model 301 can be previously trained using a triplet training scheme. The triplet training scheme can utilize a plurality of image triplets. For example, each image triplet in the plurality of image triplets can include an anchor image, a positive image, and a negative image. For instance, the anchor image, the positive image, and the negative image can be previously obtained from the global image database 230. In some implementations, the anchor image can be associated with a respective geolocation that is closer to a respective geolocation associated with the positive image than a respective geolocation associated with the negative image. In addition, or alternatively, the positive image can be associated with a respective heading angle within a respective heading angle associated with the anchor image by a heading threshold.

At (530), the method 500 can include accessing a database of a plurality of pre-computed image embeddings 255. For example, the localization system 185 can access the image embedding database 250. The plurality of pre-computed image embeddings 255 are previously computed for a plurality of images 235 by the machine-learned image embedding model 310. For example, each of the plurality of images 235 stored in a global image database 230 can be input into the machine-learned image embedding model 310 to receive a corresponding image embedding for each image in the global image database 230.

As discussed above, the database of pre-computed image embeddings (e.g., image embedding database 250) can be remotely located from vehicle 105 (e.g., an autonomous vehicle). In such a case, localization system 185 can access the image embedding database 250 via one or more communication system 120 onboard vehicle 105.

At (540), the method 500 can include obtaining a plurality of candidate embeddings 325. For example, the localization system 185 can obtain a plurality of candidate embeddings 325 from a database of pre-computed image embeddings (e.g., image embedding database 250). The localization system 185 can obtain the plurality of candidate embeddings 325 from the database of pre-computed image embeddings (e.g., image embedding database 250) based at least in part on vehicle location data 220 associated with vehicle 105 (e.g., an autonomous vehicle). For example, the localization system 185 can obtain vehicle location data 220 from one or more sensor(s) 125 onboard vehicle 105. In addition, the localization system 185 can obtain the plurality of candidate embeddings 325 based at least in part on image location data 240 associated with each pre-computed image embedding in the database of pre-computed image embeddings (e.g., image embedding database 250). For example, each pre-computed image embedding can be associated with image location data 240 corresponding to a respective image in the global image database 230.

The vehicle location data 220 associated with the vehicle 105 (e.g., an autonomous vehicle) and the image location data 240 associated with each of the pre-computed image embeddings in the database of pre-computed image embeddings (e.g., image embedding database 250) can include geolocation coordinates. In some implementations, obtaining a plurality of candidate embeddings 325 from the database of pre-computed image embeddings (e.g., image embedding database 250) includes determining a distance between the vehicle location data 220 and the image location data 240. For example, the localization system 185 can determine a Euclidean distance between the geolocation coordinates associated with the vehicle 105 (e.g., an autonomous vehicle) and the geolocation coordinates associated with each pre-computed image embedding in the database of pre-computed image embeddings (e.g., image embedding database 250). The localization system 185 can obtain the plurality of candidate embeddings 325 from the pre-computed image embeddings associated with a Euclidean distance below a distance threshold.

At (550), the method 500 can include identifying a subset of candidate embeddings 335. For example, the localization system 185 can compare the query embedding 315 to the plurality of candidate embeddings 325 to identify a subset of candidate embeddings 335 that satisfy a threshold. For example, the localization system 185 can identify a subset of candidate embeddings 335 that have embeddings that satisfy a similarity threshold.

At (560), the method 500 can include determining a single location estimate 270 based on the subset of candidate embeddings 335. For example, the localization system 185 can determine a localized state of the vehicle 105 (e.g., an autonomous vehicle) based at least in part on the image location data 240 associated with each pre-computed image embedding in the subset of candidate embeddings 335.

At (570), the method 500 can include updating the localized state of vehicle 105 based on the single location estimate 270. For example, localization system 185 can output a single location estimate 270 to vehicle computing system 100. By way of example, the localization system 185 can communicate, via communication systems 120, with positioning system 150. Positioning system 150 can synthesize the single location estimate 270 with additional location data associated with vehicle 105 to determine a localized state of vehicle 105. The positioning system 150 can update the localized state of vehicle 105 with the determined localized state.

In addition, or alternatively, the method 500 can include controlling the motion of the vehicle 105 based at least in part on the localized state of the vehicle 105. For example, vehicle 105 can include an autonomous and/or semi-autonomous vehicle with autonomy system 130. In such a case, the localization system 185 can control the motion of vehicle 105 based at least in part on the localized state of the vehicle 105.

Figure 6:
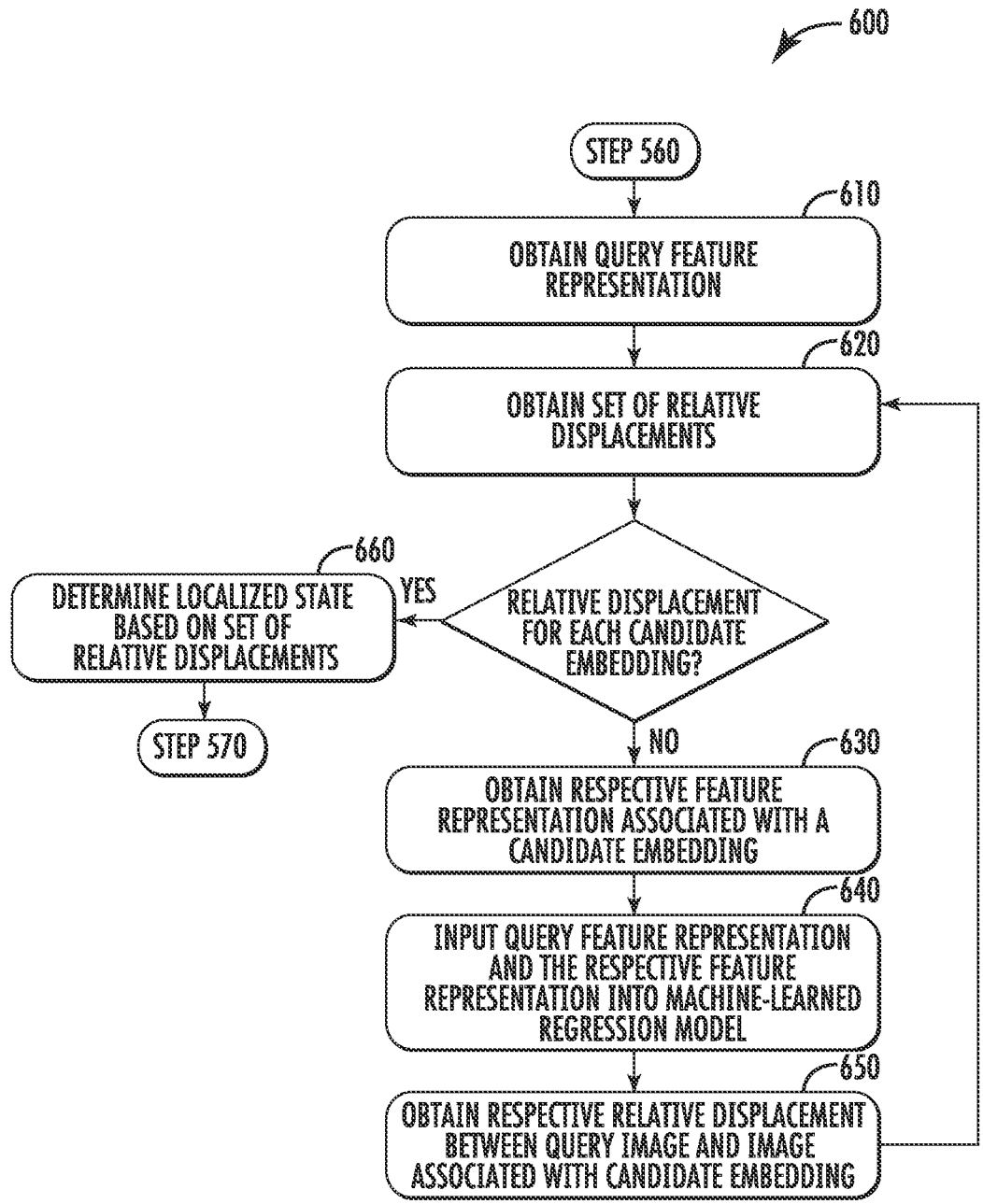
FIG. 6 depicts a flowchart diagram of an example method of determining a set of relative displacements between a query image and one or more images according to example implementations of the present disclosure.

FIG. 6 depicts a flowchart diagram of an example method 600 of determining a set of relative displacements between a query image 210 and one or more images 235 according to example implementations of the present disclosure. One or more portion(s) of the method 600 can be implemented by a computing system that includes one or more computing devices such as, for example, the computing systems described with reference to the other figures (e.g., the vehicle computing system 100, the localization system 185, the operations computing system 190, etc.). Each respective portion of the method 600 can be performed by any (or any combination) of one or more computing devices. Moreover, one or more portion(s) of the method 600 can be implemented as an algorithm on the hardware components of the device(s) described herein (e.g., as in FIGS. 1 and/or 9), for example, to allow a vehicle 105 to determine a location based on image data. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 6 is described with reference to elements/terms described with respect to other systems and figures for example illustrated purposes and is not meant to be limiting. One or more portions of method 600 can be performed additionally, or alternatively, by other systems.

Method 600 begins at (560) of method 500 whereby a computing system (e.g., vehicle computing system 100, localization system 185, and/or operations computing system 190, etc.) determines a localized state based on a subset of candidate embeddings 335.

At (610), the method 600 can include obtaining a query feature representation 345. For example, localization system 185 can input the query image 210 into machine-learned feature extraction model 330 to obtain a query feature representation 345 based on query image 210. In this manner, the localization system 185 can obtain, via the machine-learned feature extraction model 330, a query feature representation 345 by inputting the query image 210 into the machine-learned feature extraction model 330.

At (620), the method 600 can include obtaining a set of relative displacements. To do so, steps 630-650 are repeated for each of a plurality of candidate images. The plurality of candidate images can be respectively associated with the subset of candidate embeddings 335. For example, each candidate embedding in the subset of candidate embeddings 335 can be associated with a respective candidate image in the plurality of candidate images. In this manner, the localization system 185 can obtain a set of relative displacements including a respective relative displacement between the query image 210 and the respective candidate image associated with each of the candidate embeddings in the subset of candidate embeddings 335. At (620), if the set of relative displacements does not include a respective relative displacement for each candidate embedding in the subset of candidate embeddings 335, the method 600 continues to (630).

At (630), the method 600 can include obtaining a respective feature representation associated with a candidate embedding. For example, the localization system 185 can obtain a respective feature representation associated with a candidate image associated with the candidate embedding. In some implementations, the respective feature representation for the candidate image corresponding to the candidate embedding in the subset of candidate embeddings 335 is previously computed by the machine-learned feature extraction model 330. For example, the respective feature representation for a respective candidate image associated with each candidate embedding in the subset of candidate embeddings 335 can be previously computed for each of the plurality of images 235 in the global image database 230 by the machine-learned feature extraction model 330. In such an implementation, obtaining a respective feature representation can include obtaining the respective feature representation from a database of feature representations.

For example, localization system 185 can obtain each respective feature representation from feature embedding database 260. The feature embedding database 260 can be remotely located from vehicle 105 (e.g., an autonomous vehicle). The localization system 185 access (e.g., via one or more communication system 120), the feature embedding database 260 to obtain the respective feature representation associated with each candidate image in the plurality of candidate images.

At (640), the method 600 can include inputting the query feature representation 345 and the respective feature representation into machine-learned regression model 350. For example, for each candidate embedding in the subset of candidate embeddings 335, the localization system 185 can input the query feature representation 345 and the respective feature representation for the respective candidate image associated with the candidate embedding into the machine-learned regression model 340.

The machine-learned feature extraction model 330 and the machine-learned regression model 330 can include one or more previously trained machine-learned models. For example, the machine-learned regression model 340 and the machine-learned feature extraction model 330 can be jointly trained end-to-end on a set of training data that comprises a plurality of pairs of training images. In an example, each pair of training images can have a known ground truth displacement between the pair of training images. For instance, each pair of training images can be obtained from the global image database 230.

At (650), the method 600 can include obtaining a respective relative displacement between the query image 210 and the candidate image associated with the candidate embedding. For example, the localization system 185 can obtain a respective relative displacement between the query image 210 and the candidate image associated with the candidate embedding as an output from the machine-learned feature extraction model 330. In this manner, the localization system 185 can obtain, via the machine-learned regression model 340, a respective relative displacement by inputting the query feature representation 345 and the respective feature representation into the machine-learned regression model 340.

At (660), the method can include determining a localized state based on the set of relative displacements. For example, the localization system 185 can determine the localized state of vehicle 105 (e.g., an autonomous vehicle) based at least in part on the set of relative displacements. For example, localization system 185 can determine a localized state of an autonomous vehicle based at least in part on the respective displacement obtained for each of the plurality of candidate images associated with each image embedding in the subset of image embeddings 335.

Figure 7:
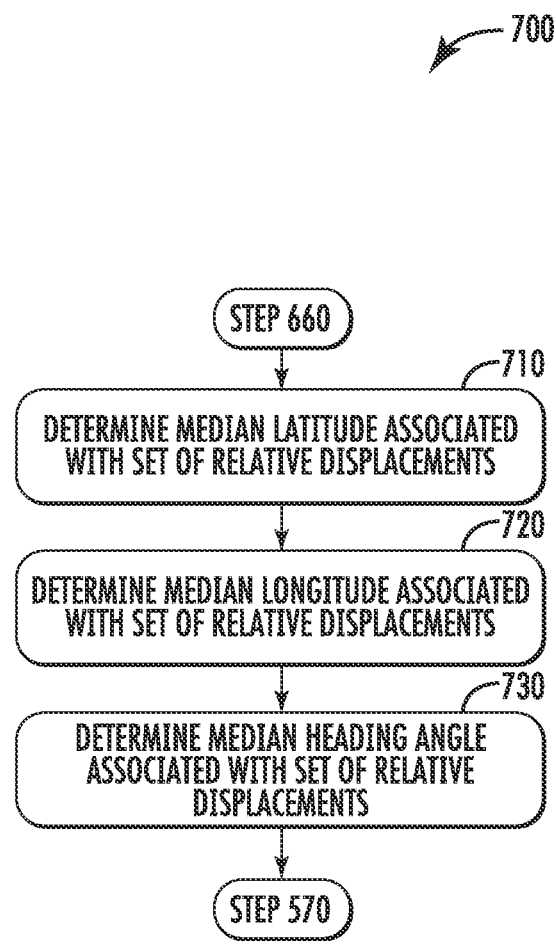
FIG. 7 depicts a flowchart diagram of an example method of aggregating a set of relative displacements according to example implementations of the present disclosure.

FIG. 7 depicts a flowchart diagram of an example method 700 of aggregating a set of relative displacements according to example implementations of the present disclosure. One or more portion(s) of the method 700 can be implemented by a computing system that includes one or more computing devices such as, for example, the computing systems described with reference to the other figures (e.g., the vehicle computing system 100, the localization system 185, the operations computing system 190, etc.). Each respective portion of the method 700 can be performed by any (or any combination) of one or more computing devices. Moreover, one or more portion(s) of the method 700 can be implemented as an algorithm on the hardware components of the device(s) described herein (e.g., as in FIGS. 1 and/or 9), for example, to allow a vehicle 105 to determine a location based on image data. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 7 is described with reference to elements/terms described with respect to other systems and figures for example illustrated purposes and is not meant to be limiting. One or more portions of method 700 can be performed additionally, or alternatively, by other systems.

Method 700 begins at (660) of method 600 whereby a computing system (e.g., vehicle computing system 100, localization system 185, operations computing system 190, etc.) determines a localized state based on a set of relative displacements. The method 700 can include aggregating the set of relative displacements. For example, localization system 185 can determine the localized state of the vehicle 105 based at least in part on the set of relative displacements by aggregating the set of relative displacements to obtain a single location estimate. The single location estimate 270, for example, can include the localized state of vehicle 105.

As depicted by FIG. 7, aggregating the set of relative displacements can include determining one or more median location coordinates and a median heading angle associated with the set of relative displacements. For example, at (710), the method 700 can include determining a median latitude associated with the set of relative displacements. At (720), the method 700 can include determining a median longitude associated with the set of relative displacements and, at (730), the method 700 can include determining a median heading angle associated with the set of relative displacements.

The method 700 can then return to (570) of method 500 whereby a computing system (e.g., vehicle computing system 100, localization system 185, operations computing system 190, etc.) updates the localized state of the vehicle 105 based on the single location estimate 270. For example, localization system 185 can update the localized state of vehicle 105 with the median latitude, median longitude, and the median heading angle associated with the set of relative displacements.

Figure 8:
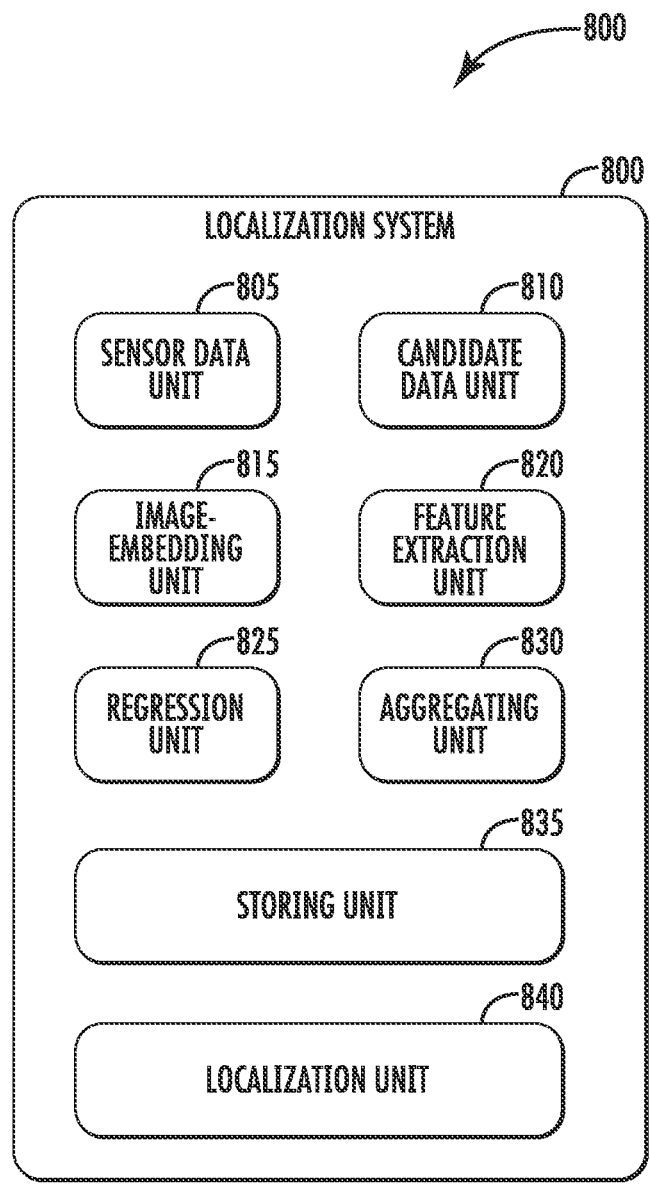
FIG. 8 depicts example system with various means for performing operations and functions according to example implementations of the present disclosure.

Various means can be configured to perform the methods and processes described herein. For example, FIG. 8 depicts a diagram of an example a computing system 800 that includes various means according to example embodiments of the present disclosure. The computing system 800 can be and/or otherwise include, for example, the localization system 185. The computing system 800 can include sensor data unit(s) 805, candidate data unit(s) 810, image-embedding unit(s) 815, feature extraction unit(s) 820, regression unit(s) 825, aggregation unit(s) 830, storing unit(s) 835, localization unit(s) 840 and/or other means for performing the operations and functions described herein. In some implementations, one or more of the units may be implemented separately. In some implementations, one or more units may be a part of or included in one or more other units.

These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. The methods (e.g., 500, 600, 700) and/or other operations described herein can be implemented as such algorithm(s). For instance, the means (e.g., the localization unit(s) 840) can be configured for determining a localized state of an autonomous vehicle. The means (e.g., the sensor data unit(s) 805) can be configured for receiving a query image 210 collected by vehicle 105 and depicting a surrounding environment of vehicle 105 (e.g., an autonomous vehicle). In addition, the means (e.g., the sensor data unit(s) 805) can be configured to obtain vehicle location data 220 associated with vehicle 105. The means (e.g., the image embedding unit(s) 815) can be configured for inputting the query image 210 into a machine-learned image embedding model 310 to receive a query embedding 315 as an output of the machine-learned image embedding model 310. As described herein, the machine-learned image embedding model 310 can be configured to output an image embedding based on one or more input images. The means (e.g., the candidate data unit(s) 810) can be configured for accessing a database of pre-computed image embeddings (e.g., image embedding database 250). In addition, the means (e.g., the candidate data unit(s) 810) can be configured for obtaining a plurality of candidate embeddings 325 from the database of pre-computed image embeddings (e.g., image embedding database 250) based at least in part on vehicle location data 220 associated with vehicle 105 (e.g., an autonomous vehicle) and image location data 240 associated with each pre-computed image embedding in the database of pre-computed image embeddings (e.g., image embedding database 250). As described herein, each of the plurality of pre-computed image embeddings 255 of image embedding database 250 can be previously computed for a plurality of images 235 (e.g., from global image database 230) by the machine-learned image embedding model 310. Each of the plurality of pre-computed image embeddings 255 of image embedding database 250 can associated with respective image location data 240. For example, each pre-computed image embedding in the image embedding database 250 can be associated with the image location data 240 corresponding to a respective image in the global image database 230.

The means (e.g., the image embedding unit(s) 815) can be configured for comparing the query embedding to the plurality of candidate embeddings 325 to identify a subset of candidate embeddings 335 that have embeddings that satisfy a similarity threshold. The means (e.g., the localization unit(s) 840) can be configured for determining a single location estimate 270 based on the subset of candidate embeddings 335. For example, the means (e.g., the localization unit(s) 840) can be configured for determining a localized state of the vehicle 105 (e.g., an autonomous vehicle) based at least in part on the image location data 240 associated with each pre-computed image embedding in the subset of candidate embeddings 335. For instance, the means (e.g., the localization unit(s) 840) can be configured for updating the localized state of the vehicle 105 (e.g., an autonomous vehicle) based on the single location estimate 270.

The means can be configured for determining a set of relative displacements between the query image 210 and each image associated with the subset of candidate embeddings 335 as described herein. For instance, the means (e.g., the feature extraction unit(s) 820) can be configured for inputting the query image 210 into a machine-learned feature extraction model 330 to obtain a query feature representation 345 for the query image 210. In addition, the means (e.g., the feature extraction unit(s) 820) can be configured for obtaining a respective feature representation for a respective image associated with each candidate embedding in the subset of candidate embeddings 335. For example, the means (e.g., the storing unit(s) 835) can be configured to store a feature embedding database 260 including a plurality of feature representation 265. As described herein, each feature representation in the plurality of feature representations 265 can correspond to at least one image 235 in a global image database 230. For example, each respective image in the global image database 230 can be input into the machine-learned feature extraction model 330 to receive a feature representation corresponding to the respective image. The means (e.g., the regression unit(s) 825) can be configured, for each candidate embedding in the subset of candidate embeddings 335, for inputting the query feature representation 345 and the respective feature representation for a respective image associated with a candidate embedding into a machine learned regression model 340. The means (e.g., the regression unit(s) 825) can be further configured to obtain a respective relative displacement between the query image 210 and the image associated with the candidate embedding for each candidate embedding in the subset of candidate embeddings 335. The means (e.g., localization unit(s) 840) can be configured for determining a localized state based on the set of relative displacements.

The means (e.g., the aggregation unit(s) 830) can be configured for aggregating the set of relative displacements to determine a single location estimate 270. This can include, for instance, determining one or more median location coordinates and a median heading angle associated with the set of relative displacements. The means (e.g., aggregating unit(s) 830) can be configured for determining the median latitude associated with the set of relative displacements. The means (e.g., aggregating unit(s) 830) can be configured for determining the median longitude associated with the set of relative displacements. The means (e.g., aggregating unit(s) 830) can be configured for determining the median heading associated with the set of relative displacements. In this manner, the means (e.g., aggregating unit(s) 830) can be configured to determine a single location estimate 270 including a single latitude, longitude, and heading angle.

These described functions of the means are provided as examples and are not meant to be limiting. The means can be configured for performing any of the operations and functions described herein.

Figure 9:
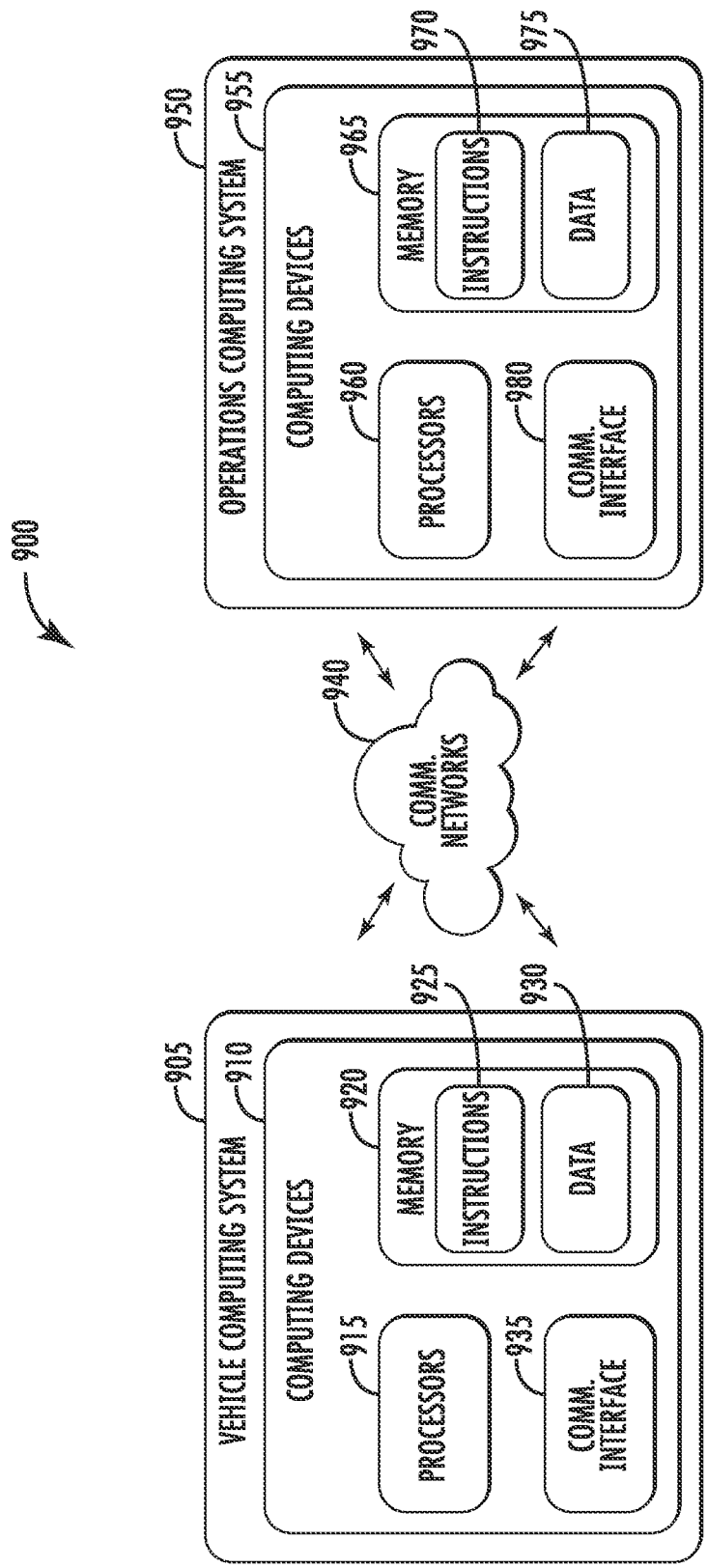
FIG. 9 depicts example system components according to example implementations of the present disclosure.

FIG. 9 depicts an example system 900 according to example embodiments of the present disclosure. The example system 900 illustrated in FIG. 9 is provided as an example only. The components, systems, connections, and/or other aspects illustrated in FIG. 9 are optional and are provided as examples of what is possible, but not required, to implement the present disclosure. The example system 900 can include a vehicle computing system 905 of a vehicle. The vehicle computing system 905 can represent/correspond to the vehicle computing systems described herein (e.g., vehicle computing system 100). The example system 900 can include a remote computing system 950 (e.g., that is remote from the vehicle computing system 905). The remote computing system 950 can represent/correspond to, for example, any of the computing systems that are remote from the vehicle described herein (e.g., the operations computing system 190, etc.). The vehicle computing system 905 and the remote computing system 950 can be communicatively coupled to one another over one or more network(s) 940.

The computing device(s) 910 of the vehicle computing system 905 can include processor(s) 915 and a memory 920. The one or more processors 915 can be any suitable processing device (e.g., a processor core, a microprocessor, an ASIC, a FPGA, a controller, a microcontroller, etc.) and can be one processor or a plurality of processors that are operatively connected. The memory 920 can include one or more non-transitory computer-readable storage media, such as RAM, ROM, EEPROM, EPROM, one or more memory devices, flash memory devices, data registrar, etc., and combinations thereof.

The memory 920 can store information that can be accessed by the one or more processors 915. For instance, the memory 920 (e.g., one or more non-transitory computer-readable storage mediums, memory devices) on-board the vehicle can include computer-readable instructions 925 that can be executed by the one or more processors 915. The instructions 925 can be software written in any suitable programming language or can be implemented in hardware. Additionally, or alternatively, the instructions 925 can be executed in logically and/or virtually separate threads on processor(s) 915.

For example, the memory 920 can store instructions 925 that when executed by the one or more processors 915 cause the one or more processors 915 (the vehicle computing system 905) to perform operations such as any of the operations and functions of the vehicle computing system 100 (or for which it is configured), one or more of the operations and functions of the localization system (or for which it is configured), one or more of the operations and functions of the operations computing systems 195 described herein (or for which it is configured), one or more of the operations and functions for determining the localized state of a vehicle, one or more portions of the methods 500, 600, 700, and/or one or more of the other operations and functions of the computing systems described herein.

The memory 920 can store data 930 that can be obtained (e.g., acquired, received, retrieved, accessed, created, stored, written, manipulated, etc.). The data 930 can include, for instance, sensor data, map data, vehicle state data, perception data, prediction data, motion planning data, data associated with a vehicle client, data associated with a service entity's telecommunications network, data associated with an API, data associated with one or more images such as image location data, data indicative of one or more image embeddings, data indicative of one or more feature representations, and/or other data/information such as, for example, that described herein. In some implementations, the computing device(s) 910 can obtain data from one or more memories that are remote from the vehicle computing system 905.

The computing device(s) 910 can also include a communication interface 935 used to communicate with one or more other system(s) on-board a vehicle and/or a remote computing device that is remote from the vehicle (e.g., of the remote computing system 950). The communication interface 935 can include any circuits, components, software, etc. for communicating via one or more networks (e.g., network(s) 1040). The communication interface 935 can include, for example, one or more of a communications controller, receiver, transceiver, transmitter, port, conductors, software and/or hardware for communicating data.

The remote computing system 950 can include one or more computing device(s) 955 that are remote from the vehicle computing system 905. The computing device(s) 955 can include one or more processors 960 and a memory 965. The one or more processors 960 can be any suitable processing device (e.g., a processor core, a microprocessor, an ASIC, a FPGA, a controller, a microcontroller, etc.) and can be one processor or a plurality of processors that are operatively connected. The memory 965 can include one or more tangible, non-transitory computer-readable storage media, such as RAM, ROM, EEPROM, EPROM, one or more memory devices, flash memory devices, data registrar, etc., and combinations thereof.

The memory 965 can store information that can be accessed by the one or more processors 960. For instance, the memory 965 (e.g., one or more tangible, non-transitory computer-readable storage media, one or more memory devices, etc.) can include computer-readable instructions 970 that can be executed by the one or more processors 960. The instructions 970 can be software written in any suitable programming language or can be implemented in hardware. Additionally, or alternatively, the instructions 970 can be executed in logically and/or virtually separate threads on processor(s) 960.

For example, the memory 965 can store instructions 970 that when executed by the one or more processors 960 cause the one or more processors 960 to perform operations such as any of the operations and functions of the operations computing systems 195 described herein, any of the operations and functions of the localization system 185 as described herein, one or more of the operations and functions for determining a localized state of an autonomous vehicle, one or more portions of the methods 500, 600, 700, and/or one or more of the other operations and functions described herein.

The memory 965 can store data 975 that can be obtained. The data 975 can include, for instance, data associated with vehicles (sensor data, vehicle location data, map data, vehicle state data, perception data, prediction data, motion planning data, data associated with a vehicle client, data associated with a service entity's telecommunications network, data associated with an API, etc.), data indicative of one or more images (e.g., global image database 230), data indicative of one or more image embeddings (e.g., image embedding database 250), data indicative of one or more feature representations (e.g., feature embedding database 260), and/or other data/information such as, for example, that described herein. In some implementations, the computing device(s) 955 can obtain data from one or more memories that are remote from the computing system 950 and/or are onboard a vehicle.

The computing device(s) 955 can also include a communication interface 980 used to communicate with one or more system(s) local to and/or remote from the computing system 950. The communication interface 980 can include any circuits, components, software, etc. for communicating via one or more networks (e.g., network(s) 940). The communication interface 980 can include, for example, one or more of a communications controller, receiver, transceiver, transmitter, port, conductors, software and/or hardware for communicating data.

The network(s) 940 can be any type of network or combination of networks that allows for communication between devices. In some implementations, the network(s) 940 can include one or more of a local area network, wide area network, the Internet, secure network, cellular network, mesh network, peer-to-peer communication link and/or some combination thereof and can include any number of wired or wireless links. Communication over the network(s) 940 can be accomplished, for instance, via a communication interface using any type of protocol, protection scheme, encoding, format, packaging, etc.

Computing tasks, operations, and functions discussed herein as being performed at a vehicle (e.g., via the vehicle computing system 100, localization system 185, etc.) can instead be performed by computing device(s) that are remote from the vehicle (e.g., via a vehicle provider computing system, an operations computing system 190, etc.), and/or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The communications between computing systems described herein can occur directly between the systems or indirectly between the systems. For example, in some implementations, the computing systems can communicate via one or more intermediary computing systems. The intermediary computing systems can alter the communicated data in some manner before communicating it to another computing system. Moreover, data obtained by a computing system can be manipulated in some manner before it is communicated to another system.

The number and configuration of elements shown in the figures is not meant to be limiting. More or less of those elements and/or different configurations can be utilized in various embodiments.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for determining a location of a vehicle, the method comprising:
   receiving image data associated with an environment of the vehicle;
   processing the image data with a machine-learned image embedding model to generate a query embedding for the image data;
   identifying one or more identified image embeddings of a plurality of image embeddings associated with the environment of the vehicle based on a plurality of similarity scores between the plurality of image embeddings and the query embedding, wherein one or more similarity scores of the plurality of similarity scores satisfy a threshold similarity score, the one or more similarity scores respective to the one or more identified image embeddings; and
   determining the location of the vehicle based on a comparison between the query embedding and the one or more identified image embeddings of the plurality of image embeddings associated with the environment of the vehicle.

2. The computer-implemented method of claim 1, wherein the plurality of image embeddings are previously computed for a plurality of images of the environment by the machine-learned image embedding model.

3. The computer-implemented method of claim 1, wherein the one or more identified image embeddings associated with the environment of the vehicle are obtained from a feature representation database remotely located from the vehicle.

4. The computer-implemented method of claim 1, further comprising:
   obtaining the one or more identified image embeddings associated with the environment of the vehicle based on vehicle location data associated with the vehicle.

5. The computer-implemented method of claim 4, wherein the vehicle location data comprises coarse geolocation coordinates.

6. The computer-implemented method of claim 5, wherein the coarse geolocation coordinates comprise global positioning system coordinates.

7. The computer-implemented method of claim 4, wherein the one or more identified image embeddings are associated with image location data, and wherein the one or more identified image embeddings associated with the environment of the vehicle are obtained based on a comparison between the vehicle location data and the image location data.

8. The computer-implemented method of claim 7, wherein the location of the vehicle is determined based on the image location data.

9. The computer-implemented method of claim 1, wherein the image data comprises a query image depicting at least a portion of a surrounding environment of the vehicle.

10. The computer-implemented method of claim 9, wherein determining the location of the vehicle based on the comparison between the query embedding and the one or more identified image embeddings associated with the environment of the vehicle comprises:
    determining a relative displacement between the query image and an image associated with at least one of the one or more identified image embeddings; and
    determining the location of the vehicle based on the relative displacement.

11. The computer-implemented method of claim 1, wherein the location of the vehicle is indicative of one or more current geolocation coordinates and a heading angle of the vehicle.

12. The computer-implemented method of claim 1, wherein the image data is camera data, LIDAR data, or RADAR data.

13. A computing system comprising:
    one or more processors; and
    one or more tangible, non-transitory, computer readable media that store instructions for execution by the one or more processors to cause the computing system to perform operations, the operations comprising:
    receiving image data associated with an environment of a vehicle;
    processing the image data with a machine-learned image embedding model to generate a query embedding for the image data;
    identifying one or more identified image embeddings of a plurality of image embeddings associated with the environment of the vehicle based on a plurality of similarity scores between the plurality of image embeddings and the query embedding, wherein one or more similarity scores of the plurality of similarity scores satisfy a threshold similarity score, the one or more similarity scores respective to the one or more identified image embeddings; and
    determining a location of the vehicle based on a comparison between the query embedding and the one or more identified image embeddings of the plurality of image embeddings associated with the environment of the vehicle.

14. The computing system of claim 13, wherein the plurality of image embeddings are previously computed for a plurality of images of the environment by the machine-learned image embedding model.

15. The computing system of claim 13, further comprising:
    obtaining the one or more identified image embeddings associated with the environment of the vehicle based on vehicle location data associated with the vehicle.

16. The computing system of claim 13, wherein the image data comprises a query image depicting at least a portion of a surrounding environment of the vehicle.

17. The computing system of claim 16, wherein the computing system is located onboard the vehicle, wherein the computing system comprises one or more cameras, and wherein the query image is collected by the one or more cameras.

18. The computing system of claim 13, wherein the vehicle comprises an autonomous truck.

19. The computing system of claim 18, wherein the operations further comprise:
    controlling a motion of the autonomous truck based on the location of the vehicle.

20. One or more non-transitory, computer-readable media storing instructions that are executable by one or more processors to cause the one or more processors to perform operations, the operations comprising:
    receiving image data associated with an environment of a vehicle;
    processing the image data with a machine-learned image embedding model to generate a query embedding for the image data;
    identifying one or more identified image embeddings of a plurality of image embeddings associated with the environment of the vehicle based on a plurality of similarity scores between the plurality of image embeddings and the query embedding, wherein one or more similarity scores of the plurality of similarity scores satisfy a threshold similarity score, the one or more similarity scores respective to the one or more identified image embeddings; and determining a location of the vehicle based on a comparison between the query embedding and the one or more identified image embeddings of the plurality of image embeddings associated with the environment of the vehicle.

* * * * *